(12) United States Patent
Chu et al.

(10) Patent No.: US 9,032,119 B2
(45) Date of Patent: May 12, 2015

(54) ADAPTIVE POLLING OF INFORMATION FROM A DEVICE

(71) Applicant: Alcatel-Lucent USA Inc., Murray Hill, NJ (US)

(72) Inventors: Thomas P. Chu, Englishtown, NJ (US); Ahmet A. Akyamac, Bridgewater, NJ (US); Dan Kushnir, Springfield, NJ (US); Huseyin Uzunalioglu, Millington, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/950,574

(22) Filed: Jul. 25, 2013

(65) Prior Publication Data

US 2015/0032875 A1    Jan. 29, 2015

(51) Int. Cl.
*G06F 3/00* (2006.01)
*H04L 12/26* (2006.01)

(52) U.S. Cl.
CPC ...................................... *H04L 43/10* (2013.01)

(58) Field of Classification Search
USPC .......................................................... 710/46
See application file for complete search history.

(56) References Cited

U.S. PATENT DOCUMENTS

| | | | |
|---|---|---|---|
| 6,931,460 B2 | 8/2005 | Barrett | |
| 7,093,141 B2 * | 8/2006 | Elnozahy et al. | 713/300 |
| 7,289,495 B2 * | 10/2007 | Roy | 370/381 |
| 7,751,437 B2 * | 7/2010 | Spinar et al. | 370/468 |

OTHER PUBLICATIONS

Chang, Adaptive Polling Algorithm for Reducing Polling Delay and Increasing Utilization for High Density Subscribers in WiMAX Wireless Networks, 2006, IEEE, pp. 1-5.*
Cisco Prime Network 3.8 Administrator Guide, Revised: Mar. 8, 2013, Chapter 22, Customizing VNE Polling; Text Part Number: OL-24644-01, 28 pages.
Feng Gao et al. (University of Auckland, New Zealand), A Dynamic Polling Scheme for the Network Monitoring Problem, 12 pages, Oct. 2, 2003.

* cited by examiner

*Primary Examiner* — Henry Tsai
*Assistant Examiner* — Dean Phan
(74) *Attorney, Agent, or Firm* — Wall & Tong LLP

(57) ABSTRACT

A capability is provided for adaptive polling of a device based on a set of polling control regions configured to control polling of the device. The set of polling control regions is defined based on at least one of a set of control parameters and non-parametric control information. A transition within the set of polling control regions is determined based on a current polling control region and a target polling control region that is determined based on input information received while in the current polling control region. The input information may include at least one of values of one or more parameters in the set of parameters and non-parametric input information. The transition may include remaining in the current polling control region or transitioning to a new polling control region. The transition may be performed based on a rapid up controlled down (RUCD) transition scheme.

17 Claims, 15 Drawing Sheets

ADAPTIVE POLLING OF INFORMATION FROM A DEVICE

TECHNICAL FIELD

The disclosure relates generally to polling and, more specifically but not exclusively, to adaptive polling of information from a device.

BACKGROUND

Polling may be used to collect information in many types of applications and environments. For example, polling may be used by a network operator of a communication network to acquire information from network devices of the communication network (e.g., to acquire status information, performance statistics, and various other types of information which may be available from the network devices of communication networks), user premises equipment utilizing services via the communication network, or the like. In many types of polling, it may be necessary or desirable to dynamically balance the amount of information collected via polling with the amount of resources consumed in collecting such information.

SUMMARY OF EMBODIMENTS

Various deficiencies in the prior art are addressed by embodiments for adaptive polling of a set of devices to collect information from the set of devices.

In at least some embodiments, an apparatus includes a processor and a memory communicatively connected to the processor, where the processor is configured to control polling of a device based on a set of polling control regions configured to control polling of the device. The set of polling control regions is defined based on at least one of a set of multiple control parameters and non-parametric control information. The set of polling control regions includes at least two polling control regions. The processor is configured to receive, while in a current polling control region, input information including at least one of a set of values associated with the set of multiple control parameters and non-parametric input information. The processor is configured to determine a target polling control region, from the set of polling control regions, based on the input information. The processor is configured to determine a transition within the set of polling control regions based on the current polling control region and the target polling control region.

In at least some embodiments, a computer-readable storage medium stores instructions which, when executed by a computer, cause the computer to perform a method that is configured to control polling of a device based on a set of polling control regions configured to control polling of the device. The set of polling control regions is defined based on at least one of a set of multiple control parameters and non-parametric control information. The set of polling control regions includes at least two polling control regions. The method includes receiving, while in a current polling control region, input information including at least one of a set of values associated with the set of multiple control parameters and non-parametric input information. The method includes determining a target polling control region, from the set of polling control regions, based on the input information. The method includes determining a transition within the set of polling control regions based on the current polling control region and the target polling control region.

In at least some embodiments, a method includes using a processor and a memory for controlling polling of a device based on a set of polling control regions configured to control polling of the device. The set of polling control regions is defined based on at least one of a set of multiple control parameters and non-parametric control information. The set of polling control regions includes at least two polling control regions. The method includes receiving, while in a current polling control region, input information including at least one of a set of values associated with the set of multiple control parameters and non-parametric input information. The method includes determining a target polling control region, from the set of polling control regions, based on the input information. The method includes determining a transition within the set of polling control regions based on the current polling control region and the target polling control region.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

An adaptive polling capability is presented herein. In at least some embodiments, the adaptive polling capability supports control over polling for various types of polling policies (e.g., for controlling one or more of the set of devices polled, the polling frequency, the information that is collected via polling, or the like, as well as various combinations thereof). In at least some embodiments, the adaptive polling capability supports control over polling for information based on at least one of parametric control information (which may include single parameter based control, multiple parameter based control, or the like) and non-parametric control information, as well as various combinations thereof. The adaptive polling capability supports various other functions as discussed in additional detail herein.

In general, polling may be used to collect information in many types of applications and environments. For example, polling may be used by a network operator of a communication network to collect information from network devices of the communication network (e.g., to collect status information, performance statistics, and various other types of information which may be available from the network devices of communication networks). For example, polling may be used by a network operator to collect information from devices located at the residential locations of customers of the network operator (e.g., from network terminal units (NTUs), residential gateway (RGs), and set top box (STBs) of residential locations). For example, polling may be used to collect data from sensors of a sensor network (e.g., temperature and wind speed sensors of a weather monitoring sensor network, body temperature and heart rate of public safety workers, or the like). It will be appreciated that polling may be performed in various other types of applications and environments. The use of polling to acquire information from a set of devices may be better understood by way of an example of an application in which polling is utilized to collect information from devices at a residential location served by a network operator, as presented in FIG. 1.

Figure 1:
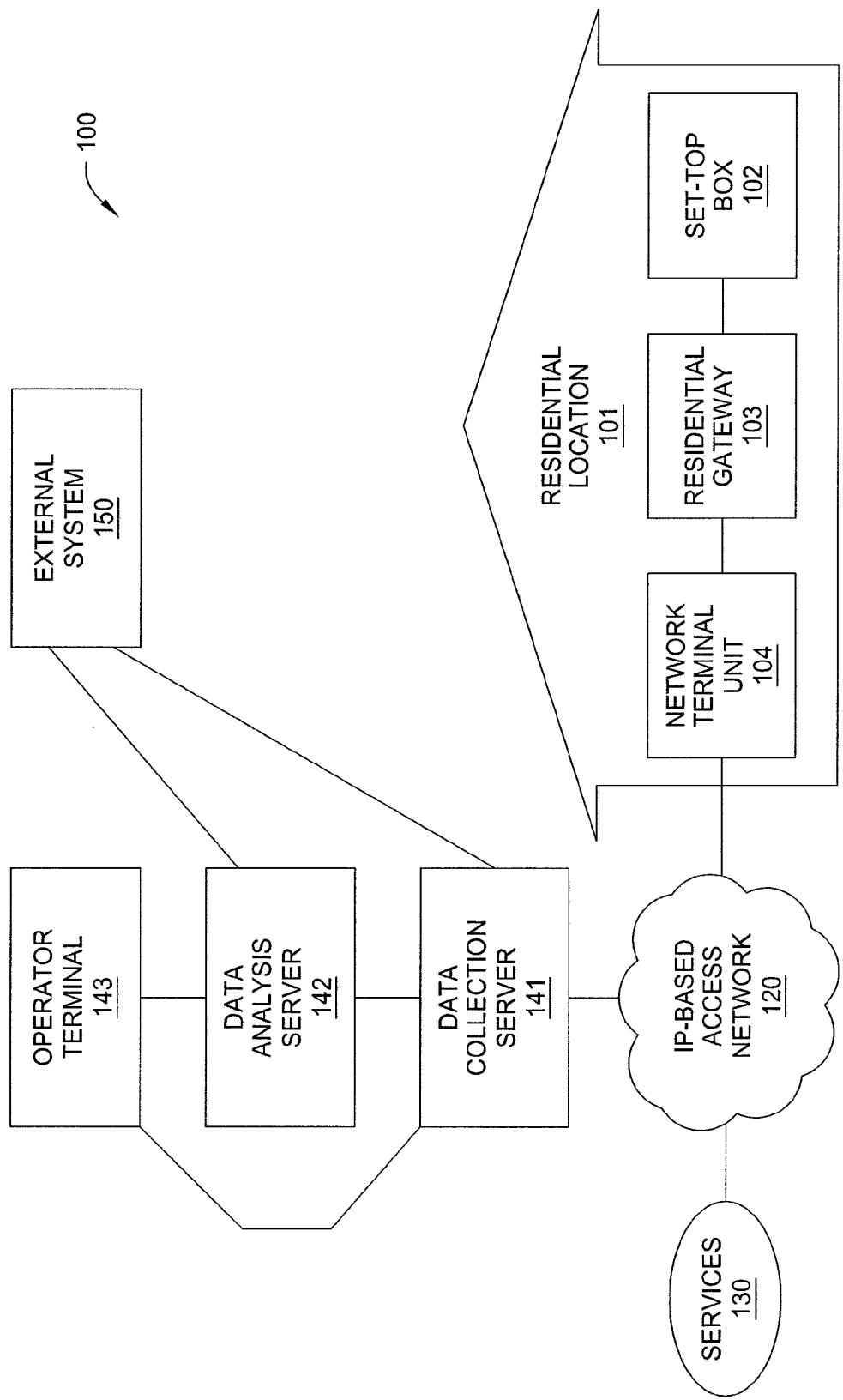
FIG. 1 depicts an exemplary environment in which a network operator providing television and communication services to a residential location uses polling to collect information from devices at the residential location.

FIG. 1 depicts an exemplary environment in which a network operator providing television and communication services to a residential location uses polling to collect information from devices at the residential location.

The exemplary environment 100 includes a residential location (RL) 101, an Internet Protocol (IP)-based access network 120, and a set of services 130. The devices at RL 101 include a set top box (STB) 102, a residential gateway (RG) 103, and a network terminal unit (NTU) 104. The STB 102 is connected to the RG 103. The RG 103 is connected to the NTU 104. The NTU 104 is connected to IP-based access network 120, via which customers at RL 101 can access the set of services 130 (e.g., television service, Internet service, or the like) of the network operator that are subscribed to by the customers at RL 101.

The exemplary environment 100 also includes a data collection server (DCS) 141 connected to IP-based access network 120, a data analysis server (DAS) 142 connected to the DCS 141, and an operator terminal (OT) 143 connected to DCS 141 and DAS 142. The DCS 141 is configured to poll STB 102, RG 103, and NTU 104 at RL 101 in order to collect information from STB 102, RG 103, and NTU 104. The DAS 142 is configured to receive and analyze information collected by DCS 141. The DCS 141 may be configured to control polling of information from devices at RL 101 based on information collected by DCS 141 during polling. The DCS 141 may be configured to control polling of information from devices at RL 101 based on analysis, by DAS 142, of information collected by DCS 141 during polling. The DAS 142 may be configured to control polling of information from devices at RL 101 based on analysis of information collected by DCS 141. The DCS 141 and DAS 142 may be configured to cooperate in various other ways in order to control polling of information from devices at RL 101. The DCS 141 and DAS 142 maybe be accessed and managed via OT 143.

The exemplary environment 100 also includes an external system 150 that is communicatively connected to DCS 141 and DAS 142. The external system 150 may be configured to control polling of devices at RL 101 by controlling the operation of one or both of DCS 141 and DAS 142. The DCS 141 or DAS 142 may be configured to control polling of devices at RL 101 based on information received from external system 150 (e.g., based on parametric or non-parametric control information which may be used by DCS 141 of DAS 142 to control polling of devices at RL 101). For example, the external system 150 may be a network management system (NMS) of the network operator, a trouble ticket system (TTS) of the network operator, a third-party system (TPS) configured to interface with systems of the network operator, or the like.

As described above, the exemplary application depicted in FIG. 1 is merely one example of use of polling to collect information from a set of devices. Accordingly, various embodiments of the adaptive polling capability are described more generally herein outside of the context of any specific application or environment in which polling may be used to collect information from devices.

In general, polling is a process whereby a data collection server collects information from a set of devices (which may include one or more devices). The polling of a set of devices may be initiated by or in response to a trigger from any suitable element or set of elements (e.g., a data collection server, a data analysis server, one of the devices in the set of devices, a device not included in the set of devices, a management system, an external system, or the like, as well as various combinations thereof). The transport of information collected during polling may be provided in any suitable manner (e.g., using a transaction protocol to enable the data collection server to request that the device send the information to the data collection server, having the data collection server request that the device initiate a file transfer from the device to a designated IP address provided by the data collection server, configuring the device to send the information to the data collection server, or the like). The information collected during polling may be handled in various ways (e.g., stored, transmitted, analyzed (e.g., using network analytics where the devices are network elements in a communication network), or the like, as well as various combinations thereof) It will be appreciated that at least some embodiments of adaptive polling depicted and described herein may be provided independent of such polling characteristics.

In general, when polling is used to collect information from a set of devices, the polling may be performed based on a set of polling parameters (which also may be referred to herein as a polling policy). For example, the polling parameters may include identification of the device(s) in the set of devices to be polled, the frequency of polling of the device(s), the information to be collected from the device(s), or the like. There may be two conflicting objectives in determining these polling parameters. Namely, while it might be desirable to poll as many devices as possible, as frequently as possible, and for as much information as possible, polling in this manner may consume a large amount of resources (e.g., network resources in propagating polling requests and responses, processing resources of the polling system and the devices being polled, and the like). Accordingly, in at least some cases, the polling parameters may be controlled based on various types of information and analysis (e.g., the amount of information needed from the device(s) being polled, resources available for use in polling, costs associated with polling, various tradeoffs between such factors, or the like, as well as various combinations thereof).

In at least some embodiments, an adaptive polling strategy may be used in order to control polling based on analysis of conflicting polling objectives. In at least some adaptive polling strategies for polling a set of devices, one or more of the polling parameters (e.g., identification of the device(s) to be polled, polling frequency, information to be collected from the device(s) to be polled, or the like) may be controlled based on one or more of information collected from the device(s), analysis of information collected from the device(s) (e.g., from a data analysis server associated with a data collection server controlling polling of the device), or the like. It will be appreciated that adaptive polling of a device may be based on other factors and information.

In at least some embodiments, adaptive polling may be configured such that the polling frequency and the information being polled from a device are initially set at a nominal rate during normal circumstances and then, based on the information collected from the device and information from a data analysis server, the polling frequency may be increased and more information may be collected from the device, thereby allowing the data analysis server to identify any problems more quickly and more accurately. In at least some embodiments, adaptive polling may be configured such that resources used to perform polling (e.g., network resources, storage resources, and the like) are used more effectively. In at least some embodiments, adaptive polling may be configured to support rapid scale up and controlled scale down such that (1) when the information collected indicates that the device or the network is degrading, the polling frequency and the amount of information collected would increase rapidly, but (2) as the device or the network reverts back to normal, the polling frequency and information will decrease back to normal in a controlled manner. Various embodiments of adaptive polling are described in additional detail hereinbelow.

In at least some embodiments, adaptive polling of a set of devices may be based on a set of control parameters (including one or more control parameters). The value(s) of the control parameter(s) used to control polling of the device(s) may be obtained from any suitable source(s) of such information (e.g., via polling of the device(s), from a data analysis server (e.g., DAS 142) performing analysis of information polled from device(s), from a data analysis server (e.g., DAS 142) performing analysis of information polled from a different device(s), from one or more external systems (e.g., external system 150), or the like, as well as various combinations thereof). For purposes of clarity, embodiments depicted and described herein are primarily directed to control parameters for which the associated values of the control parameters are determined via polling.

Figure 2:
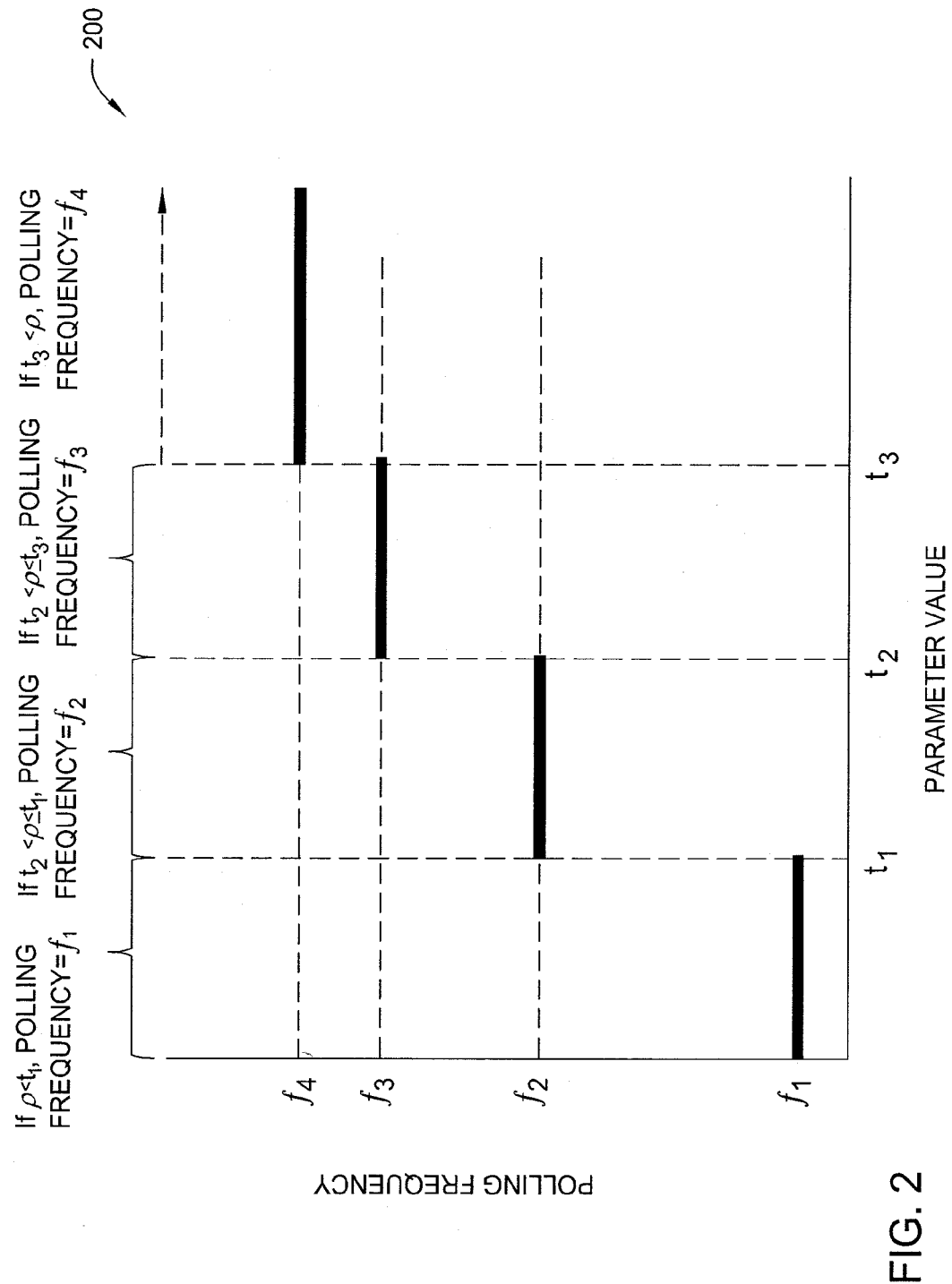
FIG. 2 depicts an exemplary polling frequency policy for controlling polling of a device based on a control parameter.

In at least some embodiments, adaptive polling of a device may be based on a single control parameter and a set of thresholds for that single control parameter. For example, where the polling frequency ($f_i$) for polling of a device depends on the value of a single control parameter (p) and three associated thresholds have been defined ($t_1$, $t_2$, and $t_3$), a polling policy for polling frequency may be specified as follows: (1) poll the device $f_1$ times per time unit if the value of $p \leq t_1$; (2) poll the device $f_2$ times per time unit if the value of $t_1 < p \leq t_2$; (3) poll the device $f_3$ times per time unit if the value of $t_2 < p \leq t_3$; and (4) poll the device $f_4$ times per time unit if the value of $t_3 > p$. The polling frequency policy for this example is depicted in FIG. 2. As depicted in FIG. 2, polling frequency policy 200 is configured such that the frequency (f) with which the device is polled increases as the value of the control parameter (t) increases. It will be appreciated that the control parameter may be any parameter which may serve as a basis for modifying polling frequency. For example, within the context of exemplary environment 100 of FIG. 1, the control parameter (p) may be an inverse of signal strength, such that as signal strength decreases the value of the control parameter (p) increases and, thus, the appropriate device of RL 101 is polled more frequently. This enables the network operator to dynamically poll the appropriate device of RL 101 more frequently based on an indication of a problem which may impact service to the customers of RL 101 (namely, based on a decrease in signal strength to RL 101).

Figure 3:
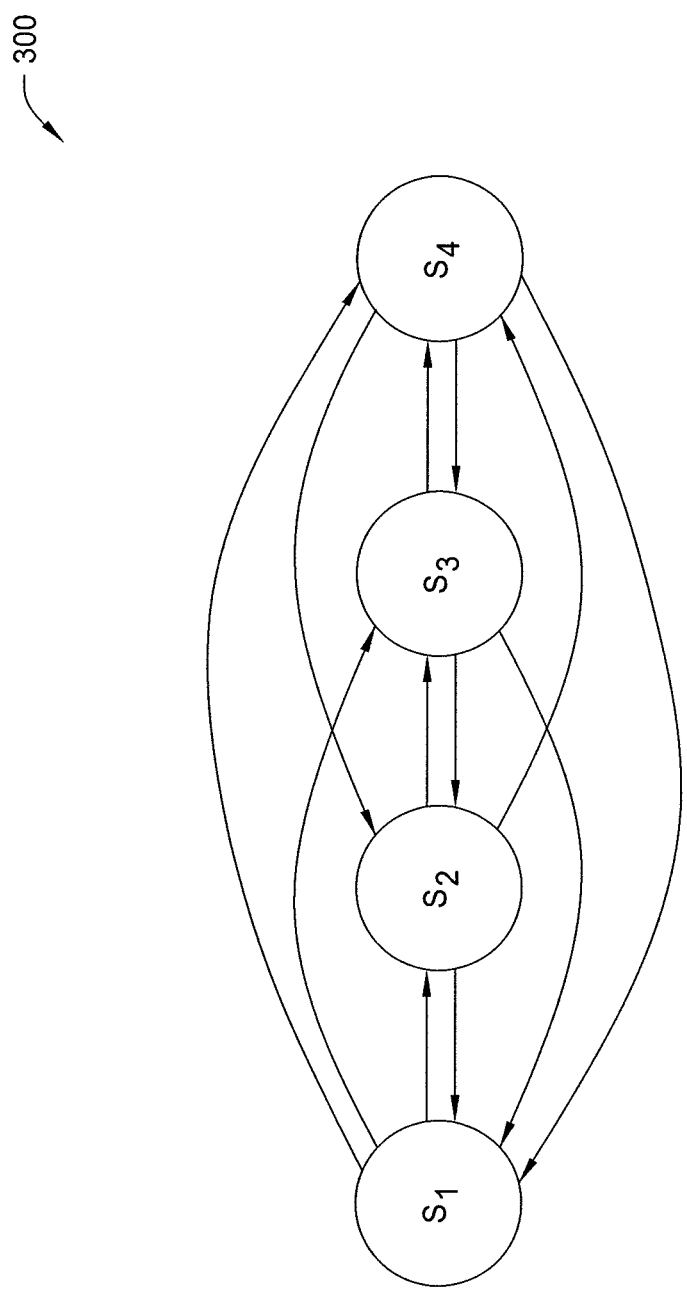
FIG. 3 depicts an exemplary polling state transition diagram for the polling frequency policy and polling control parameter of FIG. 2.

In at least some embodiments, adaptive polling of a device may be based on a state transition control mechanism. The state transition control mechanism may be configured to control state transitions, where the states represent the polling policy (e.g., values of the polling parameters) and the state transitions are controlled based on the control parameter used to control the polling policy (and, thus, the values of the polling parameter(s)). For example, in continuation of the example above in which a single control parameter is used to control polling frequency, the states may correspond to the values of the polling parameter and state transitions may be defined based on values of the control parameter and the set of thresholds used to evaluate the values of the control parameter. For example, let $S_i$ correspond to a state in which the device is polled at polling frequency $f_i$. An exemplary polling state transition diagram for the polling frequency policy 200 of FIG. 2 is depicted in FIG. 3. As depicted in FIG. 3, polling state transition diagram 300 specifies control over the polling frequency parameter $f_i$ according to which the device is polled based on values of the control parameter (p) and the three thresholds ($t_1$, $t_2$, $t_3$) used to evaluate the values of the control parameter (p). More specifically, polling state transition diagram 300 of FIG. 3 is configured such that the four values ($f_1$, $f_2$, $f_3$, $f_4$) of the polling frequency parameter (p) are represented using four states ($S_1$, $S_2$, $S_3$, $S_4$), respectively, and every state may transition directly to every other state. As a result, where the value of the control parameter p changes from a value $p_1$ that is greater than $t_3$ to a value $p_2$ that is less than $t_1$, polling of the device will transition directly from state $S_4$ to state $S_1$. In some cases, however, polling state transition diagram 300 may be unsatisfactory at least because (1) fluctuation of the parameter values of the control parameter would cause rapid shifts in polling frequency, thereby making the system unstable and (2) when the control parameter is near its critical value (indicating that the device is operating in its critical region) the polling frequency would be near its maximum as this is the time during which it is more likely to be necessary or desirable to monitor the performance of the device frequently; however, by random chance, the value of the control parameter may drop in one or more of the polls and, therefore, based on polling state transition diagram 300, polling frequency would drop accordingly (which is undesirable as the device may still be operating in its critical region).

Figure 4:
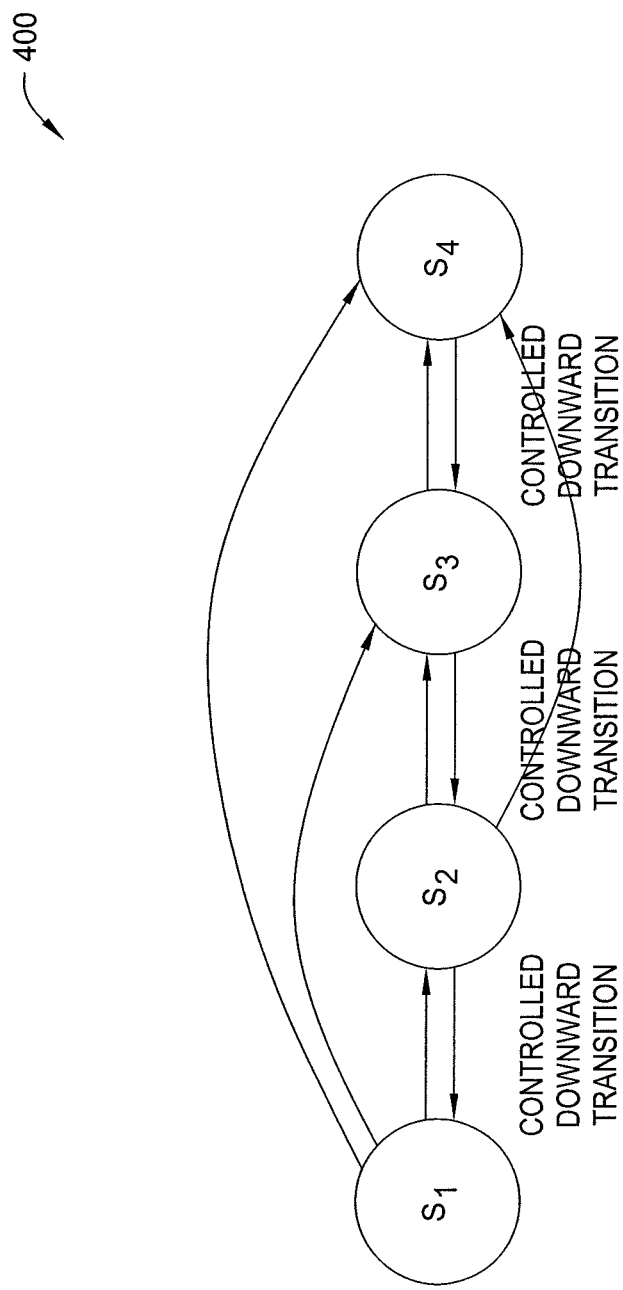
FIG. 4 depicts an exemplary polling state transition diagram for the polling frequency policy and polling control parameter of FIG. 2 in which the polling frequency policy is based on rapid up controlled down (RUCD)

In at least some embodiments, an adaptive polling capability is configured to support a Rapid Up Controlled Down (RUCD) property (which also may be referred to herein as a Rapid Up Smooth Down property or a Rapid Up Slow Down property). In RUCD, adjustment of a polling policy having one or more polling parameters is performed such that modification of the one or more polling parameters changes relatively rapidly in one direction and relatively slowly in another direction. For example, in RUCD, adjustment of the amount of information collected during polling based on a control parameter may be performed such that the amount of information collected during polling increases rapidly (relative to the speed at which the amount of information collected during polling is decreased) and decreases slowly (relative to the speed at which the amount of information collected during polling is increased). For example, in RUCD, adjustment of polling frequency based on a control parameter may be performed such that the polling frequency increases rapidly (relative to the speed at which polling frequency is decreased) and decreases slowly (relative to the speed at which polling frequency is increased). It will be appreciated that RUCD may be used to adjust other polling parameters as well as various combinations of polling parameters (although, for purposes of clarity, is primarily discussed within the context of controlling polling frequency). In RUCD, the changes in the polling parameter(s) may be controlled using various transition paths based on one or more state transition control mechanisms (e.g., one or more of a timer, a counter, a threshold, or the like, as well as various combinations thereof). It will be appreciated that use of RUCD eliminates fluctuations and unwanted scaled down which might otherwise be experienced with use of polling policies such as polling frequency policy 200. An exemplary polling state transition diagram for polling frequency policy 200 of FIG. 2, in which the polling frequency parameter is controlled using RUCD, is depicted in FIG. 4. As in polling state transition diagram 300 of FIG. 3, polling state transition diagram 400 of FIG. 4 specifies control over the polling frequency parameter $f_i$ according to which the device is polled based on values of the control parameter (p) and the three thresholds ($t_1$, $t_2$, $t_3$) used to evaluate the values of the control parameters (p). More specifically, polling state transition diagram 400 of FIG. 4 is configured such that the four values ($f_1$, $f_2$, $f_3$, $f_4$) of the polling frequency parameter (p) are represented using four states ($S_1$, $S_2$, $S_3$, $S_4$), respectively. However, unlike polling state transition diagram 300 of FIG. 3, polling state transition diagram 400 of FIG. 4 does not support direct transitions between all combinations of the states S. Rather, polling state transition diagram 400 is configured such that polling frequency f can be increased rapidly or slowly (illustratively, rapidly from $S_1$ to $S_4$ directly or slowly from $S_1$ to $S_4$ via $S_2$ and $S_3$), but can only be decreased slowly (namely, polling frequency f, rather than rapidly dropping directly from $f_4$ to $f_1$, is decreased using a smoother, more controlled transition from $f_4$ to $f_1$ which may be realized by transitioning from $S_4$ to $S_3$, from $S_3$ to $S_2$, and then from $S_2$ to $S_1$). As a result, where the value of the control parameter p changes from a value $p_1$ that is greater than $t_3$ to a value $p_2$ that is less than $t_1$, polling of the device will only transition from state $S_4$ to state $S_3$, not directly to state $S_1$. Thus, polling state transition diagram 400 of FIG. 4 is configured such that when the value of control parameter (p) decreases, polling of the device will only transition to the next lower state (e.g., from $S_4$ to $S_3$) regardless of the value of control parameter (p).

It will be appreciated that, although FIGS. 2-4 primarily depict and describe specific control of a polling parameter based on a specific type of control parameter (namely, control of polling frequency using four possible values for the polling frequency parameter defined based on a control parameter having three defined thresholds associated therewith), it will be appreciated that any polling parameter(s) may be controlled in any manner based on any suitable control parameter. For example, polling frequency may be controlled in a manner for supporting ten different values for the polling frequency parameter based on nine thresholds of the control parameter. For example, polling frequency and the information collected from the polled device may be controlled based on a different type of control parameter (e.g., based on bit error rate rather than signal strength). It will be appreciated that these examples are merely a few of the various ways in which a set of polling parameters may be controlled based on a single control parameter. An exemplary embodiment of state transition control logic for controlling state transitions for a polling parameter based on a single control parameter (e.g., for polling state transition diagram 400 of FIG. 4 or any other polling state transition diagram controlling a polling parameter(s) using RUCD based on a single control parameter) is depicted in FIG. 5.

Figure 5:
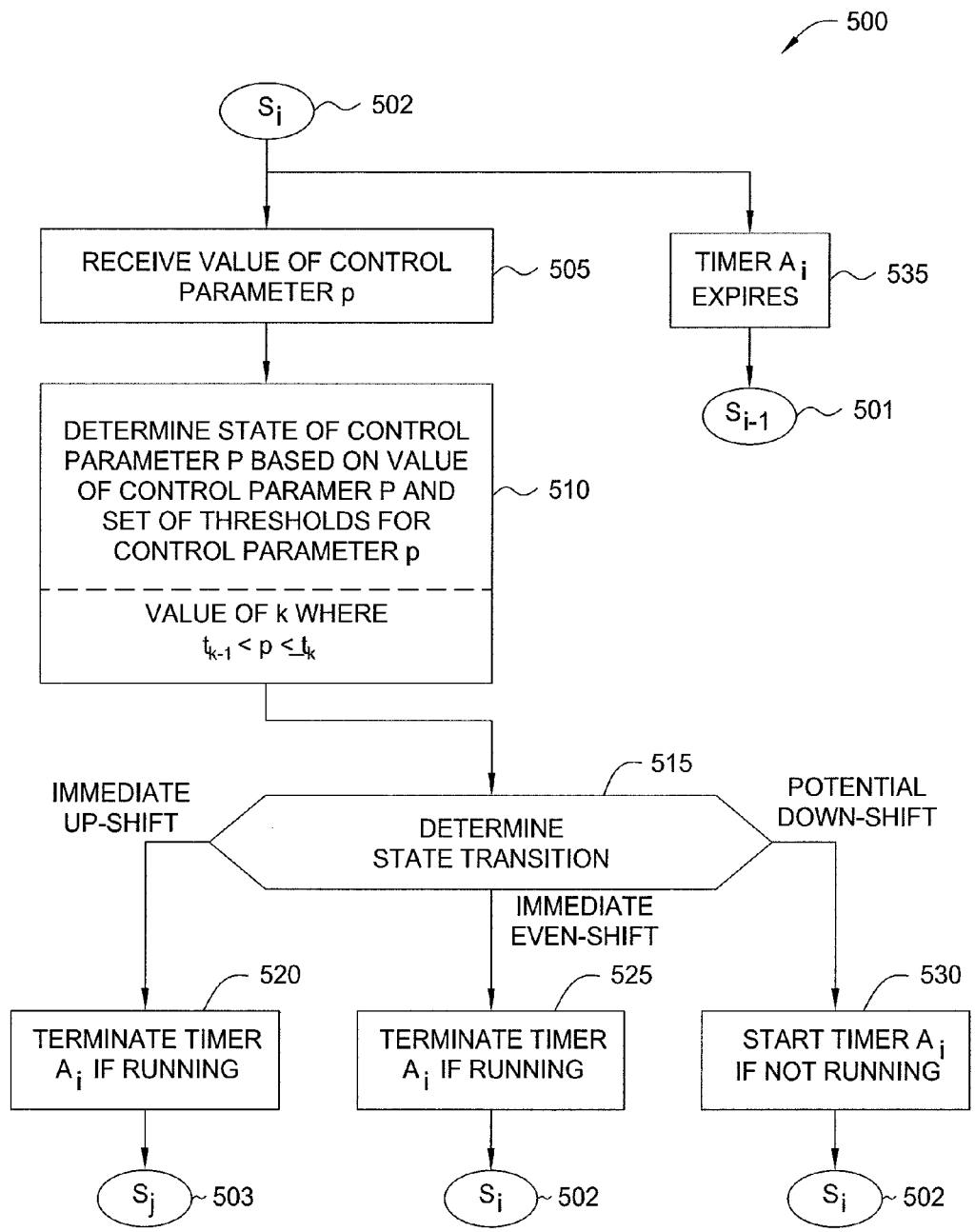
FIG. 5 depicts an exemplary embodiment of state transition control logic for controlling state transitions for a polling parameter using RUCD where the state transitions are controlled based on a single control parameter and downward state transitions also are controlled using a timer-based transition control mechanism.

FIG. 5 depicts an exemplary embodiment of state transition control logic for controlling state transitions for a polling parameter using RUCD where the state transitions are controlled based on a single control parameter and downward state transitions also are controlled using a timer-based transition control mechanism. For purposes of simplifying the description, remaining in the same state based on processing of input data (e.g., a value of a control parameter) will be considered to be a state transition to the same state (e.g., a state may have a number of internal parameters, and values of at least some of these internal parameters may change even when the system remains in the same state). It will be appreciated that, although state transition control logic 500 provides control over state transitions based on a timer-based transition control mechanism, state transition control logic 500 may be adapted to provide control over state transitions based on any other suitable type of transition control mechanism (e.g., a counter, a threshold, or the like, as discussed in additional detail hereinbelow).

At box 502, the polling frequency state S of the device is at a current polling frequency state $S_i$. The polling frequency state S of the device may have just transitioned to current polling frequency state $S_i$ or may already have been operating at current polling frequency state $S_i$. The current polling frequency state $S_i$ may or may not already have an associated timer $A_i$ (which is used to control state transitions for the polling frequency state S) running. As depicted in FIG. 5, the polling frequency state S of the device, based on values of the control parameter p and an associated timer A, may transition down to a lower polling frequency state $S_{i-1}$, remain at the current polling frequency state $S_i$, or transition up to a higher polling frequency state $S_k$.

At box 505, a value of control parameter p is received. The value of the control parameter p may be the last polled value of control parameter p, where control parameter p is a parameter for which polling of the device is performed.

At box 510, a state of the control parameter p is identified based on the value of the control parameter p. The determination of the state of control parameter p may include determining two threshold values $t_{k-1}$ and $t_k$ such that $t_{k-1} < p \le t_k$.

At box 515, a determination is made, based on the current polling frequency state $S_i$ of the device and the identified state of the control parameter p, as to whether a state transition is needed (which also may be a determination as to a type of state transition that is needed). This determination may be made by determination whether i (associated with the current polling frequency state $S_i$) is less than, equal to, or greater than k (associated with the polling frequency state $S_k$ indicated by the value of control parameter p). There are three possible outcomes of this determination, including: (1) a determination is made that i=k, which indicates that an even-shift is performed (the polling frequency state S of the device remains at current polling frequency state $S_i$), and state transition control logic 500 proceeds to box 520, (2) a determination is made that i>k, which indicates that an up-shift (also referred to herein as an upward transition) is needed, and state transition control logic 500 proceeds to box 525, or (3) a determination is made that i<k, which indicates that a down-shift (also referred to herein as a downward transition) is potentially needed (down-shift will only take place after expiration of the timer $A_i$), in which case state transition control logic 500 proceeds to box 530.

At box 520, timer $A_i$ for current polling frequency state $S_i$ is terminated and state transition control logic 500 proceeds to box 503 (i.e., an immediate up-shift occurs such that the polling frequency state S of the device transitions to a higher polling frequency state $S_j$). It will be appreciated that state transition control logic 500 may then be applied again using the higher polling frequency state $S_j$ as the current polling frequency state $S_i$ at box 502 of state transition control logic 500.

At box 525, timer $A_i$ for current polling frequency state $S_i$ is terminated and state transition control logic 500 proceeds to box 502 (i.e., the polling frequency state S of the device remains at current polling frequency state $S_i$). It will be appreciated that state transition control logic 500 may then be applied again.

At box 530, timer $A_i$ for current polling frequency state $S_i$ is started if it is not already running and state transition control logic 500 proceeds to box 502 (i.e., the polling frequency state S of the device remains at current polling frequency state $S_i$). In this case, the identified state of the control parameter p indicates that a down-shift to a lower polling frequency state $S_{i-1}$ should occur; however, since a controlled down-shift mechanism based on the timer $A_i$ is being used, the down-shift to a lower polling frequency state $S_{i-1}$ is only performed if the timer $A_i$ expires (as discussed below with respect to box 535 of state transition control logic 500). It will be appreciated that state transition control logic 500 may then be applied again.

At box 535, timer $A_i$ for current polling frequency state $S_i$ expires and state transition control logic 500 proceeds to box 501 (i.e., the polling frequency state S of the device transitions to the lower polling frequency state $S_{i-1}$). It will be appreciated that if, at any time, timer $A_i$ for current polling frequency state $S_i$ expires as indicated in box 535, state transition control logic 500 transitions to box 501 irrespective of processing associated with any other boxes of state transition control logic 500. It will be appreciated that state transition control logic 500 may then be applied again using the lower polling frequency state $S_{i-1}$ as the current polling frequency state $S_i$ at box 502 of state transition control logic 500.

It will be appreciated that state transition control logic 500 may be adapted to form a state transition control process which may be executed by a processor to control state transitions for a polling parameter using RUCD where the state transitions are controlled based on a single control parameter using a timer-based transition control mechanism.

It will be appreciated that, although primarily depicted and described with respect to use of a timer-based transition control mechanism to provide control over state transitions for a polling parameter, state transition control logic 500 may be adapted to provide control over state transitions for a polling parameter based on any other suitable type of transition control mechanism (e.g., a counter, a threshold, or the like, as discussed in additional detail hereinbelow).

It will be appreciated that, although primarily depicted and described with respect to embodiments in which state transitions for a set of polling parameters are determined based on a single control parameter, in at least some embodiments state transitions for a set of polling parameters may be determined based on multiple control parameters.

In least some embodiments, state transitions for a set of polling parameters may be determined based on multiple control parameters (denoted as control parameters $p_1, \ldots, p_n$).

In at least some embodiments in which state transitions for a set of polling parameters may be determined based on multiple control parameters, a function $k=f(p_1, \ldots p_n)$ that maps the set of control parameters $(p_1, \ldots, p_n)$ to a real number k may be defined, and k may be used to control state transitions for the set of polling parameters. For example, the function k may be a linear combination of the multiple control parameters (e.g., $k=p_1+p_2+p_3+\ldots+p_n$). For example, the function k may be a weighted linear combination of the multiple control parameters (e.g., $k=a_1{}^*p_1+a_2{}^*p_2+a_3{}^*p_3+\ldots+a_n{}^*p_n$, where the constants $a_i$ represent the relative weights of importance of the multiple control parameters relative to each other). For example, the function k may include one or more higher-order terms (e.g., $p_1{}^2, p_2{}^3$, or the like). The function k may be defined in various other ways.

In at least some embodiments in which state transitions for a set of polling parameters may be determined based on multiple control parameters, the set of multiple control parameters $(p_1, \ldots, p_n)$, which also may be referred to as an N-dimensional control parameter space of the multiple control parameters $(p_1, \ldots, p_n)$, may be partitioned into a set of control parameter regions $R_j$, j=1 ... M (which also may be referred to as control regions $R_j$). The control parameter regions $R_j$ may be non-overlapping control parameter regions, although it will be appreciated that, in at least some embodiments, at least some overlap between at least some of the control parameter regions may be supported.

The control regions $R_j$ may have respective sets of polling parameters associated therewith and may be used to control polling state transitions between the respective sets of polling parameters and, thus, to control the manner in which polling is performed. In this sense, the control regions Rj may correspond to states $S_i$ in a polling state transition diagram, where the polling states have the respective sets of polling parameters associated therewith and transitions between the polling states are controlled based on the control regions $R_j$. As in the single control parameter embodiments, the set of polling parameters may include one or more polling parameters, such as one or more of polling frequency, the information for which polling is performed, the set of devices to be polled, or the like, as well as various combinations thereof. It will be appreciated that, when the set of polling parameters is in state $S_i$, the last set of collected values for the multiple control parameters $(p_1, \ldots, p_n)$ may not be necessarily in region $R_i$, as the state transitions between the states may be performed based on RUCD.

In at least some embodiments, the control regions $R_j$ are associated with respective corresponding control regions $R_j^*$ (where a control region $R_j^*$ also may be referred to as the predecessor of $R_j$). The control regions $R_j$ and corresponding control regions $R_j^*$ are configured such that when the set of polling parameters is in a control region $R_j$ and a decrease in the set of polling parameters is indicated (e.g., based on a timer, counter, threshold, or other polling transition control mechanism), the set of polling parameters transitions to the corresponding region $R_j^*$.

The partitioning of multiple control parameters into a set of control regions $R_j$ and use of the control regions $R_j$ to control polling based on a polling policy may be better understood by way of an example. Namely, consider an example in which two control parameters are partitioned to form a set of control regions and the control regions are used to control changes to a polling policy used to control polling of a set of devices at a residential location (e.g., for polling of STB 102 and NTU 104 of RL 101 of FIG. 1). In this example, values for the two control parameters are used to control a polling policy specifying polling frequencies with which the devices at the residential location are polled. In this example, the following two control parameters are used to control polling of the set of devices: (a) a signal to noise (S/N) ratio (SNR) of NTU 104, and (b) a frame loss rate (FLR) after forward error correction at STB 102 (e.g., based on an assumption that STB 102 can detect frame loss through the use of sequence numbers or another suitable mechanism). In this example, the SNR values are collected from NTU 104 at RL 101, while the FLR values are collected from STB 102 at RL 101. It is noted that, as the value of the SNR increases, NTU 104 would perform better and, thus, the negative of the SNR is used as the value of the control parameter in this example. In this example, the two-dimensional control parameter space is partitioned into eight regions, as illustrated by exemplary control parameter partitioning 600 depicted in FIG. 6 and, thus, the polling policy to be controlled based on the two-dimensional control parameter space has eight states $(S_1, \ldots, S_8)$ associated therewith, as illustrated by exemplary polling state transition diagram 700 depicted in FIG. 7.

Figure 6:
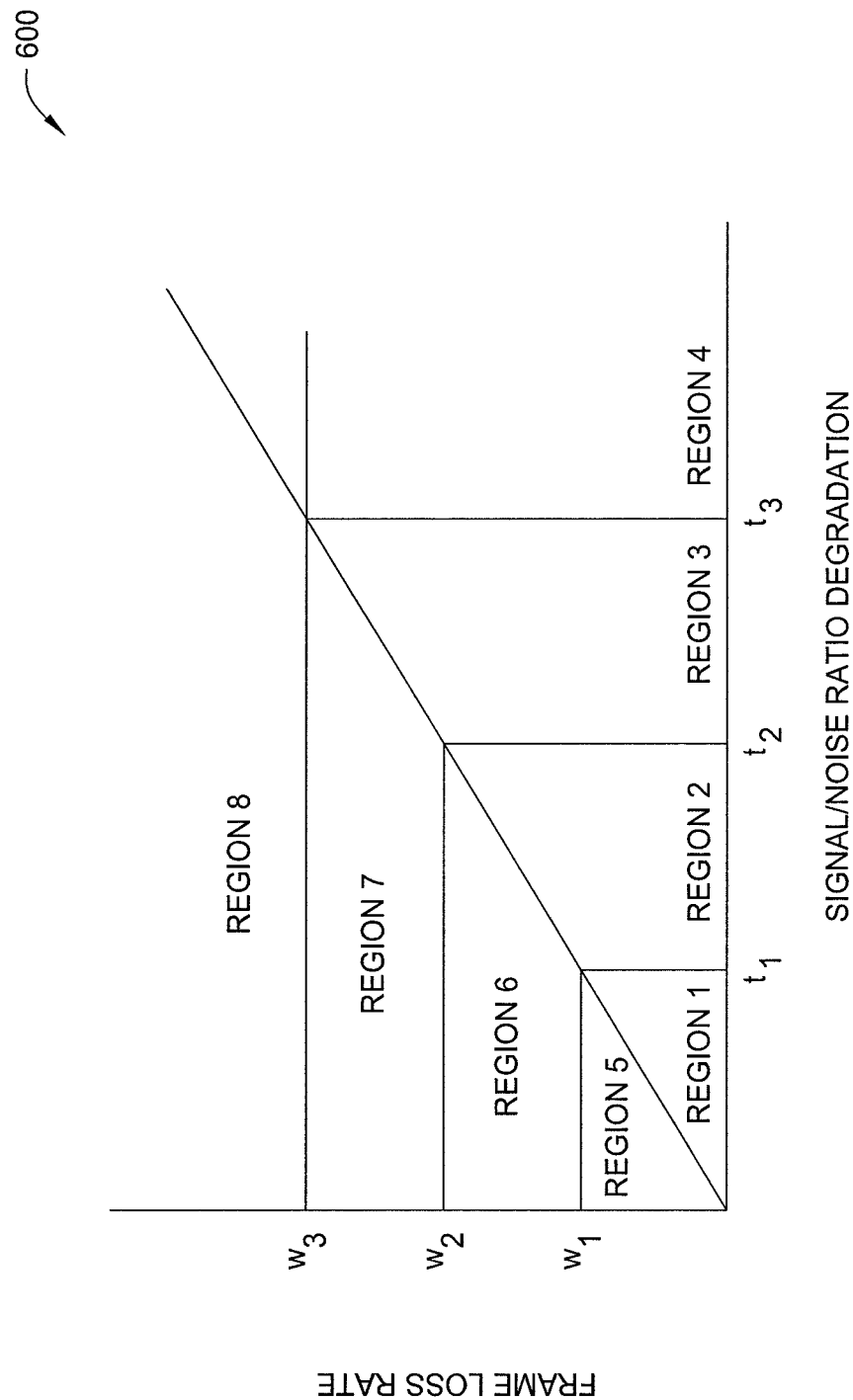
FIG. 6 depicts an exemplary partitioning of a two-dimensional control parameter space into eight regions based on values of the two control parameters of the two-dimensional control parameter space.

As depicted in FIG. 6, the parameter space defined by the SNR parameter and the FLR parameter is partitioned into eight control regions based on: (1) a partition boundary which is a straight line that partitions the parameter space into two halves, where the straight line is defined by the equation $a*p1-b*p2=k$, where p1 and p2 represent the SNR parameter and the FLR parameter, respectively (and, without loss of generality, it may be assumed that a and b are positive numbers), (2) a set of three thresholds associated with the SNR parameter (illustratively, thresholds $t_1$, $t_2$, and $t_3$), and (3) a set of three thresholds associated with the FLR parameter (illustratively, thresholds $w_1$, $w_2$, and $w_3$). For example, region 1 is defined by the following conditions: (a) p1 (the value of the SNR parameter)$<t_1$, (b) p2 (the value of the FLR parameter)$<w_1$, and (c) $a*p1-b*p2 \geq k$. Similarly, for example, region 5 is defined by the conditions: (a) p1 (the value of the SNR parameter)$<t_1$, (b) p2 (the value of the FLR parameter)$<w_1$, and (c) $a*p1-b*p2<k$. Other regions may be similarly defined, as depicted in FIG. 6.

Figure 7:
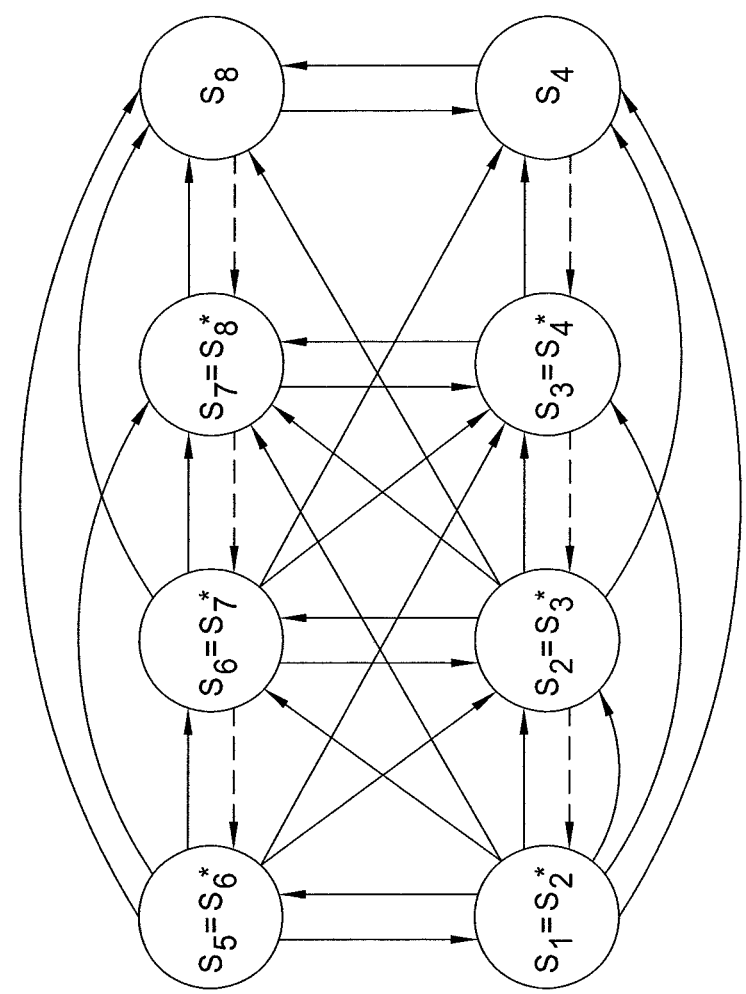
FIG. 7 depicts an exemplary polling state transition diagram for the polling policy of FIG. 6 in which the polling frequency parameter is controlled based on partitioning of a two-dimensional control parameter space into eight regions.

As depicted in FIG. 7, the eight regions defined in FIG. 6 (namely, defined based on the parameter space of the SNR parameter and the FLR parameter) correspond to eight states arranged in a state transition diagram that is configured to control polling of the set of devices at the residential location. The eight states of the state transition diagram (1) have respective sets of polling parameter values associated therewith for controlling polling of the set of devices of the residential location and (2) have respective state transition conditions associated therewith for controlling transitions between the states. A description of an exemplary polling policy for the eight regions of FIG. 6 and the eight states of FIG. 7 follows. Regions 1 and 5 of FIG. 6 correspond to states (illustratively, states $S_1$ and $S_5$ of FIG. 7) in which the set of devices at the residential location is behaving normally and, thus, the NTU and the STB may be polled at nominal frequencies, respectively. Regions 2, 3, and 4 of FIG. 6 correspond to states (illustratively, states $S_2$, $S_3$, and $S_4$ of FIG. 7) in which the SNR parameter is degrading more than the FLR parameter and, thus, it becomes desirable to poll the NTU more frequently than the STB. Regions 6, 7, and 8 of FIG. 6 correspond to states (illustratively, states $S_6$, $S_7$, and $S_8$ of FIG. 7) in which the FLR parameter is degrading more than the SNR parameter and, thus, it becomes desirable to poll the STB more frequently than the NTU. The polling frequencies for this exemplary polling policy are depicted in Table 1, which follows.

TABLE 1

| Region | State | Polling Frequency NTU | Polling Frequency STB |
|---|---|---|---|
| 1 | S1 | f0 | g0 |
| 2 | S2 | f1 | g0 |
| 3 | S3 | f2 | g1 |
| 4 | S4 | f3 | g1 |
| 5 | S5 | f0 | g0 |
| 6 | S6 | f0 | g1 |
| 7 | S7 | f1 | g2 |
| 8 | S8 | f1 | g3 | f0 < f1 < f2 < f3 and g0 < g1 < g2 < g3

It will be appreciated that, although primarily depicted and described with respect to specific partitioning of the N-dimensional control parameter space $(p_1, p_2, p_3, \ldots, p_n)$ represented by the multiple parameters into a specific number of regions, the partitioning of FIG. 6 and the associated state transition diagram of FIG. 7 are merely examples and, further, that various other configurations of partitioning and state transition diagrams may be supported. For example, partitioning may be performed using fewer or more regions. For example, partitioning may be performed such that the resulting regions are organized in other configurations. For example, the regions can be defined in other ways, e.g., based on values other than thresholds (e.g., based on discrete values, keywords, or the like), based on other types of functions (e.g., based on other types of linear functions, using non-linear functions, or the like), or the like, as well as various combinations thereof). For example, the state transition diagram may have fewer or more (as well as different) transitions (e.g., different up-shift paths, different controlled down-shift paths, or the like, as well as various combinations thereof). For example, the two down-shift paths in the example of FIGS. 6 and 7 are distinct, but these two down-shift paths could be merged (e.g., by merging regions $R_1$ and $R_5$ of FIG. 6 into a single region $R_{15}$, and replacing states $S_1$ and $S_5$ of the state transition diagram of FIG. 7 with a new state $S_{15}$ such that the two down-shift paths merges at the new state $S_{15}$. It is noted that, in the above example, the merging of region 1 and 5 is desirable as they have the same polling policy. The flexibility of partitioning and state transition diagrams that may be supported enables support for many types of adaptive polling policies.

It will be appreciated that the state transition control logic for such embodiments may be similar to the state transition control logic for embodiments in which a single parameter is used to control state transitions for the polling frequency parameter (as depicted in FIG. 5). An exemplary embodiment of state transition control logic for controlling state transitions for a polling parameter based on multiple control parameters (e.g., for polling state transition diagram 700 of FIG. 7 or any other polling state transition diagram controlling a polling parameter(s) using RUCD based on multiple control parameters) is depicted in FIG. 8.

Figure 8:
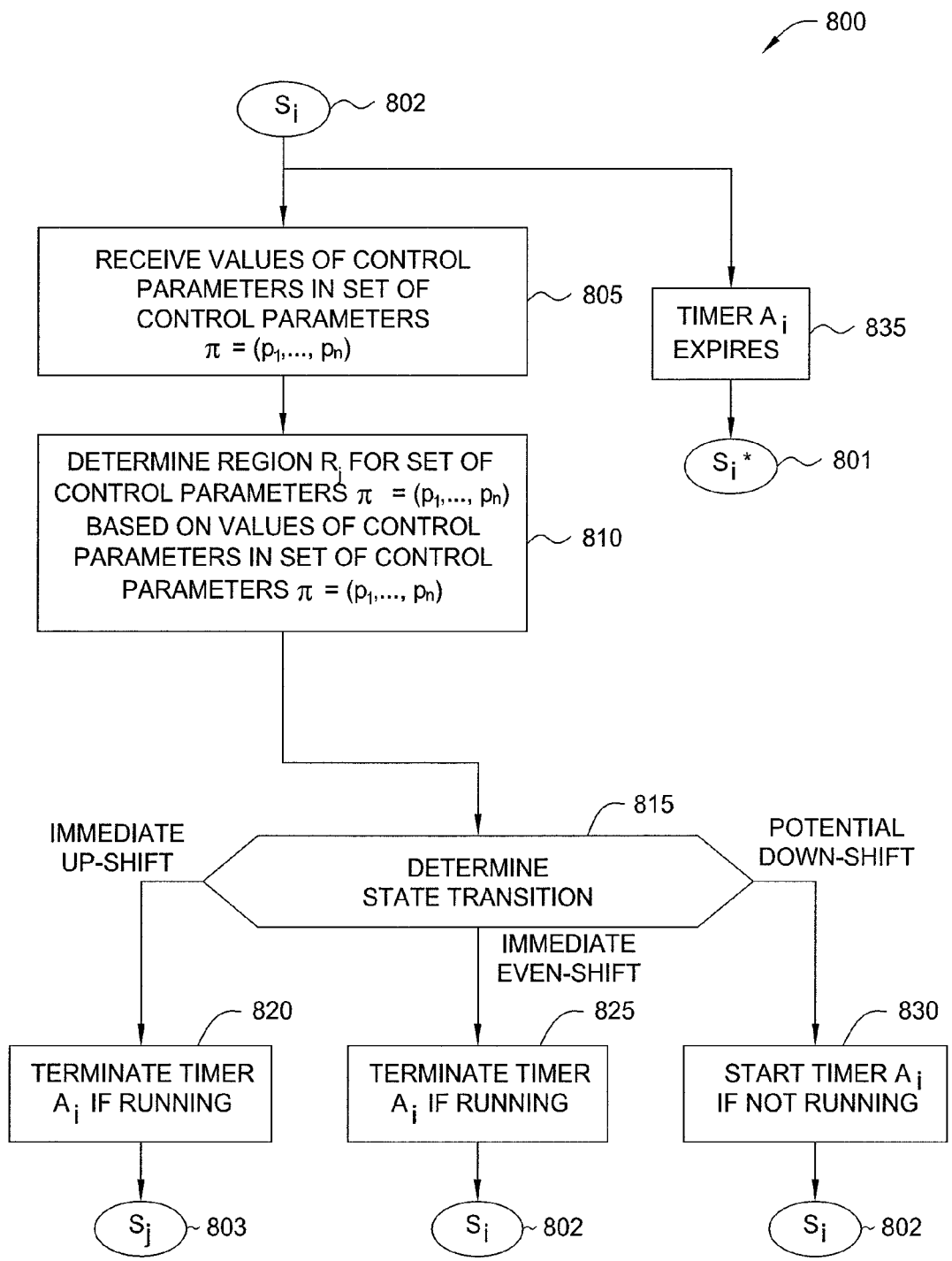
FIG. 8 depicts an exemplary embodiment of state transition control logic for controlling state transitions for a polling policy using RUCD where the state transitions are controlled based on partitioning of the multiple control parameters into regions and downward state transitions also are controlled using a timer-based transition control mechanism.

FIG. 8 depicts an exemplary embodiment of state transition control logic for controlling state transitions for a polling policy using RUCD where the state transitions are controlled based on partitioning of the multiple control parameters into regions and downward state transitions also are controlled using a timer-based transition control mechanism. For purposes of simplifying the description, remaining in the same state based on processing of input data (e.g., a value of a control parameter) will be considered to be a state transition to the same state (e.g., a state may have a number of internal parameters, and values of at least some of these internal parameters may change even when the system remains in the same state). It will be appreciated that, although state transition control logic 800 provides control over state transitions based on a timer-based transition control mechanism, state transition control logic 800 may be adapted to provide control over state transitions based on any other suitable type of transition control mechanism (e.g., a counter, a threshold, or the like, as discussed in additional detail hereinbelow).

At box 802, the polling policy state S of the device is at a current polling policy state $S_i$. The polling policy state S of the device may have just transitioned to current polling policy state $S_i$ or may already have been operating at current polling policy state $S_i$. The current polling policy state $S_i$ has a set of polling parameters and associated polling parameter values (e.g., values of one or more polling parameters such as the polling frequency, the information collected during polling, or the like) associated therewith. The current polling policy state $S_i$ may or may not already have an associated timer $A_i$ (which is used to control state transitions for the polling policy state S) running. As depicted in FIG. 8, the polling policy state S of the device, based on values of the multiple control parameters ($\pi=(p_1, p_2, p_3, \ldots, p_n)$) and an associated timer A, may transition down to a lower polling policy state $S_i^*$, remain at the current polling policy state $S_i$, or transition up to a higher polling policy state $S_j$. It is assumed that partitioning of the multiple control parameters in the set of multiple control parameters ($\pi=(p_1, p_2, p_3, \ldots, p_n)$) into a set of control regions R has already been performed.

At box 805, values of the multiple control parameters in the set of multiple control parameters ($\pi=(p_1, p_2, p_3, \ldots, p_n)$) are received. The values of the multiple control parameters in the set of multiple control parameters ($\pi=(p_1, p_2, p_3, \ldots, p_n)$) may be the last polled values of the multiple control parameters in the set of multiple control parameters ($\pi=(p_1, p_2, p_3, \ldots, p_n)$), where the multiple control parameters in the set of multiple control parameters ($\pi=(p_1, p_2, p_3, \ldots, p_n)$) are the parameters for which polling of the device is performed.

At box 810, a state of the set of multiple control parameters ($\pi=(p_1, p_2, p_3, \ldots, p_n)$) is identified based on the values of the multiple control parameters in the set of multiple control parameters ($\pi=(p_1, p_2, p_3, \ldots, p_n)$) and the partitioning of the multiple control parameters in the set of multiple control parameters ($\pi=(p_1, p_2, p_3, \ldots, p_n)$) into the set of control regions R. The determination of the state of the set of multiple control parameters ($\pi=(p_1, p_2, p_3, \ldots, p_n)$) may include determining the region $R_j$ indicated by the values of the multiple control parameters in the set of multiple control parameters ($\pi=(p_1, p_2, p_3, \ldots, p_n)$). The region $R_j$ indicated by the values of the multiple control parameters in the set of multiple control parameters ($\pi=(p_1, p_2, p_3, \ldots, p_n)$) has a set of polling parameters associated therewith.

At box 815, a determination is made, based on the current polling policy state $S_i$ of the device and the identified polling policy state of the set of multiple control parameters, as to whether a state transition is needed (which also may be a determination as to a type of state transition that is needed). There are three possible outcomes of this determination, including: (1) a determination is made that an even-shift is performed (the polling policy state S of the device remains at current state polling policy state $S_i$), in which case state transition control logic 800 proceeds to box 820, (2) a determination is made that an up-shift is needed, in which case state transition control logic 800 proceeds to box 825, or (3) a determination is made that a down-shift is potentially needed (down-shift will only take place after expiration of the timer Ai), in which case state transition control logic 800 proceeds to box 830.

At box 820, timer $A_i$ for current polling policy state $S_i$ is terminated and state transition control logic 800 proceeds to box 803 (i.e., an immediate up-shift occurs such that the polling policy state S of the device transitions to a higher polling policy state $S_j$). It will be appreciated that state transition control logic 800 may then be applied again using the higher polling policy state $S_j$ as the current polling policy state $S_i$ at box 802 of state transition control logic 800.

At box 825, timer $A_i$ for current polling policy state $S_i$ is terminated and state transition control logic 800 proceeds to box 802 (i.e., the polling policy state S of the device remains at current polling policy state $S_i$). It will be appreciated that state transition control logic 800 may then be applied again.

At box 830, timer $A_i$ for current polling policy state $S_i$ is started if it is not already running and state transition control logic 800 proceeds to box 802 (i.e., the polling policy state S of the device remains at current polling policy state $S_i$). In this case, the identified polling policy state of the set of multiple control parameters indicates that a down-shift to a lower polling policy state $S_i^*$ should occur; however, since a controlled down-shift mechanism based on the timer $A_i$ is being used, the down-shift to a lower polling policy state $S_i^*$ is only performed if the timer $A_i$ expires (as discussed below with respect to box 835 of state transition control logic 800). It will be appreciated that state transition control logic 800 may then be applied again.

At box 835, timer $A_i$ for current polling policy state $S_i$ expires and state transition control logic 800 proceeds to box 801 (i.e., the polling policy state S of the device transitions to the lower polling policy state $S_i^*$). It will be appreciated that if, at any time, timer $A_i$ for current polling policy state $S_i$ expires as indicated in box 835, state transition control logic 800 transitions to box 801 irrespective of processing associated with any other boxes of state transition control logic 800. It will be appreciated that state transition control logic 800 may then be applied again using the lower polling policy state $S_i^*$ as the current polling policy state $S_i$ at box 802 of state transition control logic 800.

It will be appreciated that state transition control logic 800 may be adapted to provide a state transition control process which may be executed by a processor to control state transitions for a polling policy using RUCD where the state transitions are controlled based on multiple control parameters using a timer-based transition control mechanism.

It will be appreciated that, although primarily depicted and described with respect to use of a timer-based transition control mechanism to provide control over state transitions for a polling policy, state transition control logic 800 may be adapted to provide control over state transitions for a polling policy based on any other suitable type of transition control mechanism (e.g., a counter, a threshold, or the like, as discussed in additional detail hereinbelow).

It will be appreciated that, although primarily depicted and described with respect to embodiments in which each polling policy state only supports down-shifting to a single predefined predecessor polling policy state, in at least some embodiments one or more of the polling policy states may support down-shifting to multiple predefined predecessor polling policy states. In at least some embodiments, a down-shift policy may be associated with a polling policy state for controlling down-shifting from the polling policy state to multiple other polling policy states in accordance with the down-shift policy. As an example, the down-shift policy for a polling policy state may depend on the values of the multiple control parameters in the set of control parameters ($\pi = (p_1, p_2, p_3, \ldots, p_n)$). In at least some embodiments, support for transitioning of a polling state to multiple other polling policy states may be implemented by modifying state transition control logic 800 such that the transition is not to a single predefined polling policy state S, but, rather, is determined based on a down-shift policy specified for the polling policy state $S_i$.

It will be appreciated that, although primarily depicted and described with respect to embodiments in which specific numbers of regions are defined based on specific numbers and combinations of multiple control parameters, any suitable numbers of regions may be defined based on any other suitable numbers or combinations of multiple control parameters.

Figure 9:
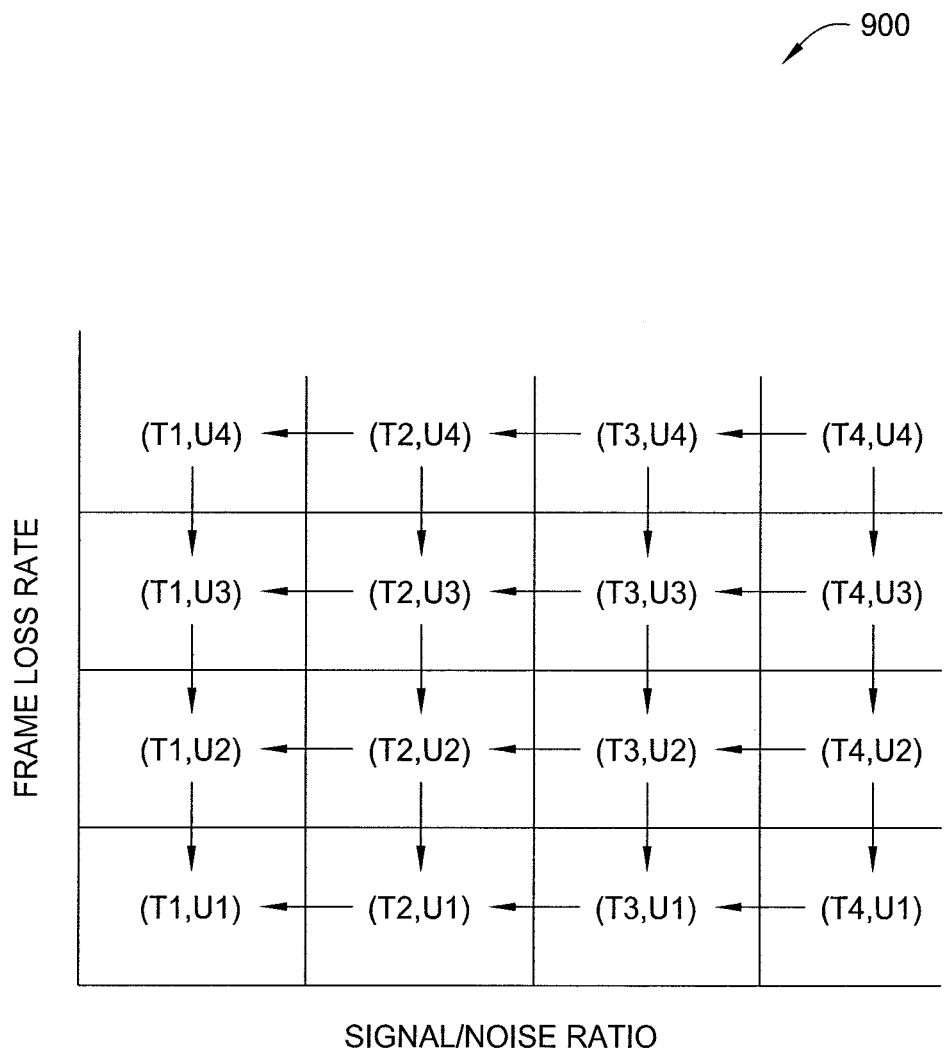
FIG. 9 depicts an exemplary polling state transition diagram for decomposition of two control parameters into two single-parameter subsets of control parameters.

It will be appreciated that, although primarily depicted and described with respect to embodiments in which use of multiple control parameters to control state transitions is performed based on a combination of the multiple parameters, in at least some embodiments use of multiple control parameters to control state transitions may be performed by decomposing the set of multiple control parameters into multiple subsets of control parameters (which also may be referred to herein as decomposing a system representing a set of control parameters into multiple subsystems). It will be appreciated that such embodiments may be better understood by reconsidering the example of FIGS. 6 and 7 in which the information collected from the device includes values of a set of control parameters that includes SNR and FLR parameters. In this example, rather than partitioning the SNR and FLR parameters into a single integrated set of eight regions, the SNR and FLR parameters may be decomposed into two single-parameter subsets of control parameters with the SNR parameter forming a first subset and the FLR parameter forming a second subset. As an example, let the states associated with the control parameter subset for the SNR parameter be $T_1, T_2, T_3$, and $T_4$, and let the timer associated with state $T_i$ be denoted as $B_i$. Similarly, let the states associated with the control parameter subset for the FLR parameter be $U_1, U_2, U_3$, and $U_4$, and let the timer associated with $U_j$ be denoted as $C_j$. The state of the set of control parameters including the SNR and FLR parameters is determined by the set of states $(T_i, U_j)$, $i=1, 4$ and $j=1, 4$. A set of polling policies is assigned for the set of states, with respective polling policies $_{ij}$ being assigned for the states $(T_i, U_j)$, respectively. The assignment of polling parameters gathered for the set of states is configured to be consistent in that (1) $f_{ij} < f_{kj}$ if $i < k$, and (2) $f_{ij} < f_{ik}$ if $j < k$, (3) for all $l, j$, and $k$. It is noted that it will be possible that two timers $B_i$ and $C_j$ are running concurrently. When timer $B_i$ expires, the control parameter subset for the SNR parameter will transition from $T_i$ to $T_{i-j}$, and the timer $C_j$ may be allowed to continue running or may be retired (although it is noted that the former embodiment may be preferable to the latter embodiment as the former embodiment tracks the dynamics of the system better). The exemplary state transition diagram for the decomposition of the two control parameters as described above is depicted in FIG. 9. As depicted in FIG. 9, exemplary state transition diagram 900 supports various state transitions based on combinations of values of the SNR and FLR parameters. It is noted that, for purposes of clarity, state transition diagram 900 of FIG. 9 only includes the downward state transitions, but that any state can transition upwards to any higher state at any time.

It will be appreciated that, although primarily depicted and described with respect to embodiments in which specific numbers of subsets of control parameters having specific numbers of control parameters included therein are defined based on specific numbers and combinations of multiple control parameters, any suitable numbers of subsets of control parameters having any suitable numbers of control parameters included therein may be defined based on any other suitable numbers or combinations of multiple control parameters.

It will be appreciated that although primarily depicted and described individually, in at least some embodiments a combination of decomposition and partitioning may be used in order to control state transitions for a set of polling parameters. For example, a set of multiple control parameters may be decomposed into multiple subsets of control parameters and, for one or more of the subsets of control parameters including multiple control parameters, the multiple control parameters of the subset of control parameters then may be partitioned into one or more sets of regions, respectively. For example, where a combination of ten control parameters is to be used to control a set of polling parameters, the set of ten control parameters may be decomposed into three subsets of control parameters including four, three, and three control parameters, respectively, and the subset of control parameters including four control parameters may then be partitioned into a set of sixteen regions based on the four control parameters. For example, where a combination of eight control parameters is to be used to control a set of polling parameters, the set of eight control parameters may be decomposed into a first subset of control parameters including four of the control parameters and a second subset of control parameters including four of the control parameters, the first subset of control parameters may be further decomposed into two subsets of control parameters (e.g., a first subset of control parameters including one of the four control parameters and a second subset of parameters including the other three of the four control parameters) and the second subset of control parameters may be partitioned into a set of regions. It will be appreciated that the foregoing examples are merely a few of the many ways in which decomposition and partitioning may be used together to control a set of polling parameters based on a set of multiple control parameters. Thus, it will be appreciated that any suitable numbers and combinations of decomposition and partitioning, into any suitable number of layers of control parameters arranged in various ways, may be supported.

It will be appreciated that, in at least some embodiments, decomposing or partitioning of a set of control parameters may be based on one or more factors (e.g., the environment in which polling is performed, the type(s) of devices being polled, the control parameters being used to control polling, the intended use of the information collected via polling, or the like, as well as various combinations thereof).

It will be appreciated that, although primarily depicted and described herein with respect to use of timer-based state transition control mechanisms to control downward transitions between states for control of polling of a device, other types of state transition control mechanisms may be used to control downward transitions between states for control of polling of a device. As noted above, other types of state transition control mechanisms may include counter-based state transition control mechanisms, threshold-based state transition control mechanisms, or the like.

In at least some embodiments, in which a counter-based state transition control mechanism is used to control downward transitions between polling states, rather than starting a timer for a current state of a state transition diagram, a counter is initialized for a current state of a state transition diagram. In at least some embodiments, the counter may be initialized to have a value of N with an operation as follows for use in controlling downward transitions between states: (a) each time the device is polled, the counter is decremented by one (1) and (b) when the counter reaches a value of zero (0), the polling state transitions downward from the current state to a lower state as specified by the state transition policy of the current state. In at least some embodiments, the counter may be initialized to have a value of 0 with an operation as follows for use in controlling downward transitions between states: (a) each time the device is polled, the counter is incremented by one (1) and (b) when the counter reaches a predefined threshold value, the polling state transitions downward from the current state to a lower state as specified by the state transition policy of the current state. It will be appreciated that other implementations of counter-based state transition control mechanisms are contemplated.

In at least some embodiments, in which a threshold-based state transition control mechanism is used to control downward transitions between polling states, different sets of thresholds may be defined for controlling upward transitions and downward transitions between polling states. Examples of threshold-based state transition control mechanisms for state transitions controlled based on a single control parameter and state transitions controlled based on multiple control parameters are depicted and described with respect to FIGS. 10 and 11, respectively.

Figure 10:
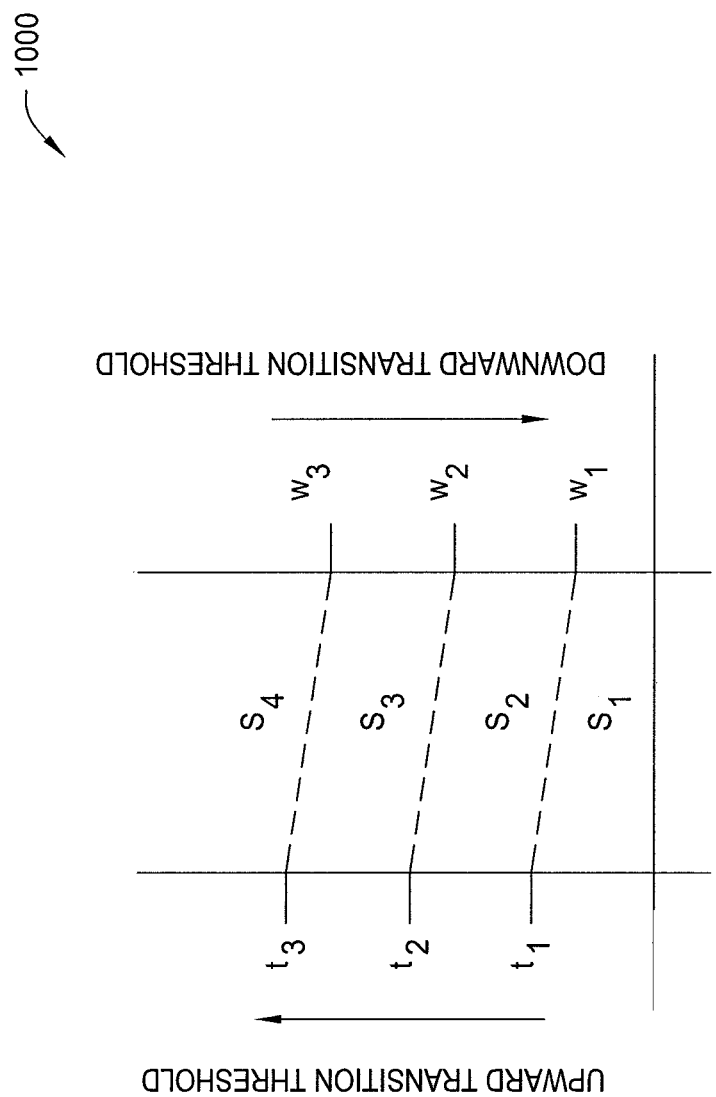
FIG. 10 depicts an exemplary polling policy in which state transitions are controlled based on a single control parameter using a threshold-based state transition control mechanism for downward transitions between states.

FIG. 10 depicts an exemplary polling policy in which state transitions are controlled based on a single control parameter using a threshold-based state transition control mechanism for downward transitions between states. The exemplary polling policy 1000 of FIG. 10 includes four states and a state transition control mechanism in which a first set of thresholds ($t_1$, $t_2$, and $t_3$) governs upward transitions between states and a second set of thresholds ($w_1$, $w_2$, and $w_3$) governs downward transitions between states where $t_i > w_i$. The operation of the state transition control mechanism may be better understood by considering an example. Namely, consider an example in which the current state is $S_3$. In this example, determination of state transitions based on the next value of the control parameter p may be made as follows: (1) if the next value of the control parameter p exceeds $t_3$, transition upward from the current state $S_3$ to state $S_4$, (2) if the next value of the control parameter p is between $w_2$ and $t_3$, remain in current state $S_3$, (3) if the next value of the control parameter p is between $w_1$ and $w_2$, transition downward from the current state $S_3$ to state $S_2$, and (4) if the next value of the control parameter p is less than $w_1$, two downward transition policies are possible as follows: (4a) transition downward from the current state $S_3$ to state $S_2$ (i.e., to the next state in the state hierarchy, which may be referred to as a strict downward transition policy) or (4b) transition downward from the current state $S_3$ to state $S_1$ (i.e., to the state which corresponds to the current value of the control parameter p, which may be referred to as a loose downward transition policy).

Figure 11:
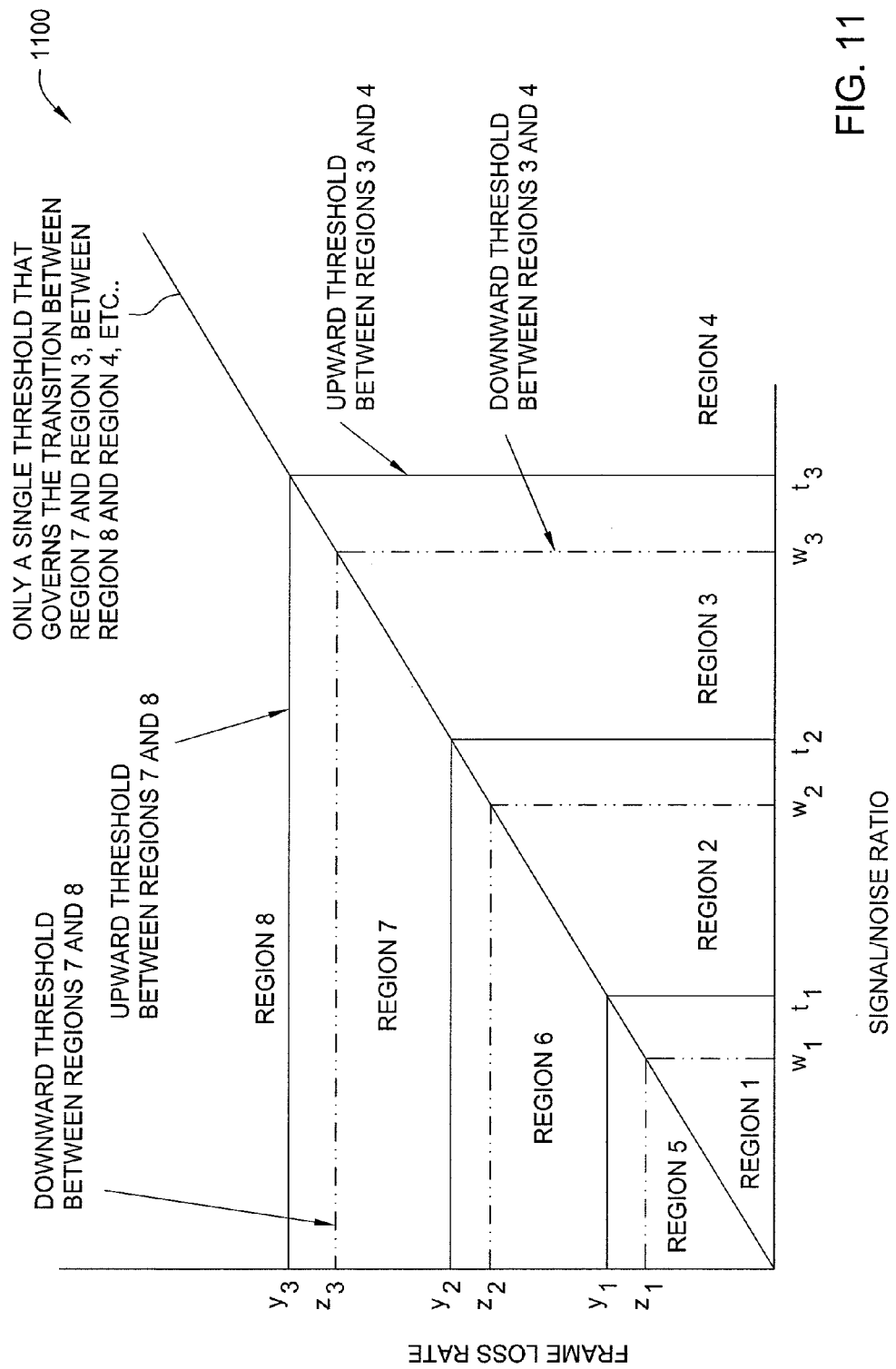
FIG. 11 depicts an exemplary polling policy in which state transitions are controlled based on multiple control parameters using a threshold-based state transition control mechanism for downward transitions between states.

FIG. 11 depicts an exemplary polling policy in which state transitions are controlled based on multiple control parameters using a threshold-based state transition control mechanism for downward transitions between states. The exemplary polling policy 1100 of FIG. 10 includes eight regions defined based on partitioning of two control parameters as depicted and described with respect to FIG. 6 (namely, based on partitioning of an SNR parameter and an FLR parameter into eight regions). As depicted in FIG. 10, the state transition control mechanism of FIG. 10 is different than the state transition control mechanism of FIG. 6 in that the state transition control mechanism of FIG. 10 supports, for each of the two parameters, two sets of thresholds governing upward transitions between regions and downward transitions between regions, respectively. Illustratively, for the SNR parameter, a first set of thresholds ($t_1$, $t_2$, and $t_3$) governs upward transitions between regions and a second set of thresholds ($w_1$, $w_2$, and $w_3$) governs downward transitions between regions. where $t_i > w_i$. Similarly, for the FLR parameter, a first set of thresholds ($y_1$, $y_2$, and $y_3$) governs upward transitions between regions and a second set of thresholds ($z_1$, $z_2$, and $z_3$) governs downward transitions between regions. where $y_i > z_i$. It will be appreciated that, although depicted and described with respect to use of a single threshold to control lateral state transitions (denoted by the diagonal line controlling transitions such as between regions $R_1$ and $R_5$, between regions $R_2$ and $R_6$, and so forth), multiple thresholds also may be used to control lateral state transitions. Thus, in general, it is possible to have separate boundaries between any adjacent regions such that upward, lateral, and downward transitions between regions may be controlled based on various combinations of thresholds. It will be appreciated that both strict and loose downward transition policies may be defined for downward transitions between regions. As previously indicated, the terms "state" and "region" may be used interchangeably herein, because each region may be considered to be a state having a polling policy and a state transition control policy associated therewith, respectively.

It will be appreciated that, although primarily depicted and described with respect to embodiments in which polling of a device is controlled based on parametric control information (namely, a set of control parameters including one or more control parameters), in at least some embodiments polling of a device may be controlled based on non-parametric control information. In at least some embodiments, a set of control regions may be defined based on non-parametric control information, and the set of non-parametric control regions may be used to control the polling of a device based on non-parametric input information. The set of control regions defined based on non-parametric control information may be referred to as a set of non-parametric control regions. The non-parametric control information may include the set of non-parametric information which may be received as non-parametric input information such that, when non-parametric input information is received for use in controlling polling of a device, the non-parametric input information may be evaluated based on the set of non-parametric control regions. The non-parametric control information and, thus, the non-parametric input information, may include free-form types of information (rather than defined parameters having defined sets of values associated therewith), such as keywords, phrases, text strings, or the like, as well as various combinations thereof. The definition of a set of non-parametric control regions based on non-parametric control information may be performed by analyzing the set of non-parametric control information (e.g., the full set of non-parametric input information that will or can be received) in order to define the set of non-parametric control regions based on the set of non-parametric control information. The use of a set of non-parametric control regions to control polling of a device based on non-parametric input information may include receiving non-parametric input information and using state transition control logic associated with the set of non-parametric control regions for determining transitions between the non-parametric control regions based on the non-parametric input information and a state transition control mechanism. The use of a set of non-parametric control regions to control polling of a device may utilize any suitable state transition control mechanism for controlling downward transitions (e.g., timer-based, counter-based, or the like). The use of a set of non-parametric control regions to control polling of a device based on non-parametric input information may be performed in a manner that is similar to control over polling of a device based on parametric input information (e.g., similar to the state transition control logic 800 of FIG. 8 for embodiments in which parametric control information is used to control polling of a device). Accordingly, non-parametric control information and non-parametric input information in embodiments of non-parametric-based control of polling may be similar to control parameters and values of control parameters in embodiments of parametric-based control of polling.

Figure 12:
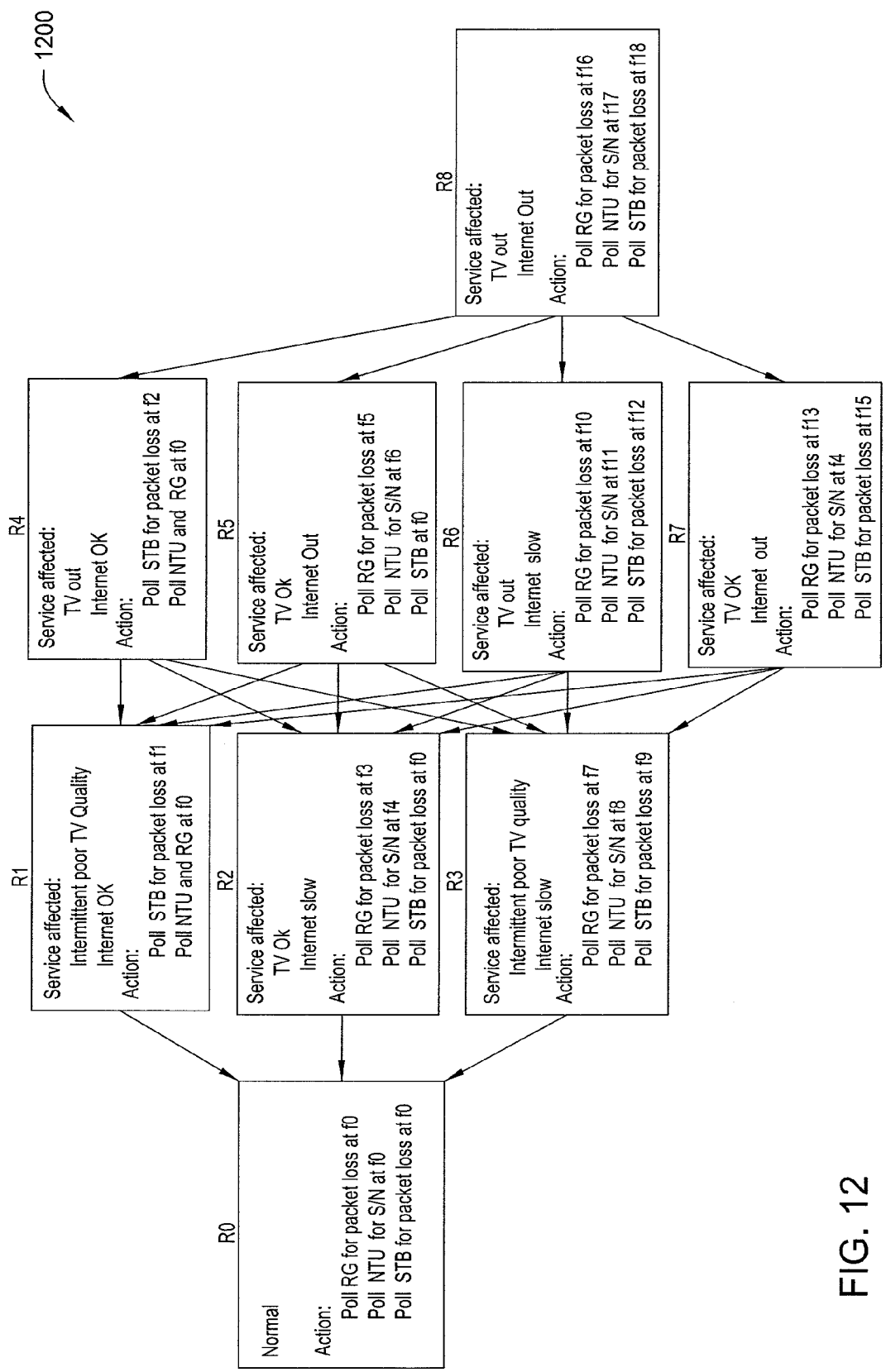
FIG. 12 depicts an exemplary partitioning of non-parametric control information into nine regions for a trouble ticket system of the exemplary environment of FIG. 1.

The use of non-parametric control information to control polling of a device may be better understood by considering an exemplary application of use of non-parametric control information to control polling of a device (e.g., use of non-parametric keyword information from a trouble ticket system of a network service provider to control polling of devices associated with the network service provider, such as may be performed by the network service provider of FIG. 1 to control polling of devices of RL 101 of FIG. 1). For example, assume that the network service provider of FIG. 1 offers cable TV service and Internet access service to customers, such as customers at RL 101. In a trouble ticket of the trouble ticket system (e.g., external system 150), there is a field that indicates the service that is affected and the severity of the trouble (denoted as the "service affected field"). For simplicity, it is assumed that both of the services have two levels of trouble. For the cable TV service, the levels are intermittent poor TV quality or the TV service is out (at least for some channels). For the Internet access service, the levels are that the Internet service is slow or the Internet service is out. As such, there are a total of nine possible regions or states, defined in a hierarchy, for the consumer. An exemplary partitioning of non-parametric input information into the nine regions for the trouble ticket system of the exemplary environment of FIG. 1 is depicted in FIG. 12. As depicted in FIG. 12, the lowest level of the hierarchy is the normal region R0 (i.e., no trouble ticket reported). In region R0, DCS 141 polls STB 102, RG 103, and NTU 104 at some nominal polling rate (e.g., once every 4 hours, once every six hours, or the like). Then, based on a determination that a trouble ticket has been created for a trouble reported by the consumer, the non-parametric control region with which the trouble is associated is determined by parsing the content of the service affected field of the trouble ticket to determine the state of the trouble. The next highest level of the hierarchy includes regions R1, R2, and R3, which correspond to states in which one or both of the services are experiencing problems, but are not out. The next highest level of the hierarchy includes regions R4, R5, R6, and R7, which correspond to states in which one of the services is out. The highest level of the hierarchy includes region R8, which corresponds to a state in which both of the services are out. The non-parametric control regions R1-R8 have corresponding polling policies associated therewith (e.g., where the polling policies may dictate one or more polling parameters, such as which of the devices at the RL 101 are to be polled, the polling frequency with which the devices at RL 101 are to be polled, the information to be collected during polling of the devices at RL 101, or the like). For example, if the TV service is affected, but the Internet access service is not affected, it is more likely that the trouble will be at STB 102 or NTU 104 and, thus, these two devices may be polled more frequently than RG 103 (e.g., polling STB 102 and NTU 104 once every 30 minutes and polling RG 103 once every four hours). For example, if the Internet access service is affected, but the TV service is not affected, it is more likely that the trouble will be at NTU 104 or RG 103 and, thus, these two devices may be polled more frequently than STB 102 (e.g., polling NTU 104 and RG 103 once every 15 minutes and polling STB 102 once every six hours). For example, if the TV service and the Internet access service are both affected, all three of the devices may be polled more frequently with more emphasis being placed on polling of NTU 104 (e.g., polling STB 102 and RG 103 once every 15 minutes and polling NTU 104 once every 5 minutes). This example illustrates the manner in which non-parametric content of a trouble ticket related to reported troubles with services supported by a set of devices may be used to map the reported troubles to regions configured for use in controlling polling of devices in the set of devices supporting the services. It is noted that subsequent updates to the trouble ticket also may trigger transitions between the regions R1-R8. It is noted that triggers from external systems also may trigger transitions between the regions R1-R8. It is noted that, in FIG. 12, the arrows are used to illustrate the hierarchy of the regions R1-R8, and not necessarily the state transitions.

It will be appreciated that, once the trouble ticket is mapped into one of the non-parametric control regions, DCS 141 may perform polling which results in collection of values of parameters which may then be used as a basis for controlling additional polling of the devices based on the values of the parameters polled by DCS 141 (i.e., based on parametric input information) and a set of parametric control regions defined based on such parametric input information). In other words, various combinations of parametric and non-parametric regions and associated input information may be used to control polling of a set of devices, as depicted and described more generally with respect to FIGS. 13 and 14.

It will be appreciated that the trouble ticket example of FIG. 12 is merely one example of the way in which non-parametric information may be used to define a set of non-parametric control regions which may be used to control polling of a set of devices. It will be appreciated that, although primarily depicted and described with respect to use of a single field as a basis for defining non-parametric control regions, any suitable number of fields may be used as a basis for defining non-parametric control regions. Similarly, it will be appreciated that, although primarily depicted and described with respect to parsing of a single field, any suitable number of fields may be parsed in order to determine non-parametric input information which may be used for controlling polling of a set of devices. It will be appreciated that, although primarily depicted and described with respect to definition and use of a specific number of non-parametric control regions, any other suitable number of non-parametric control regions may be defined and used.

Figure 13:
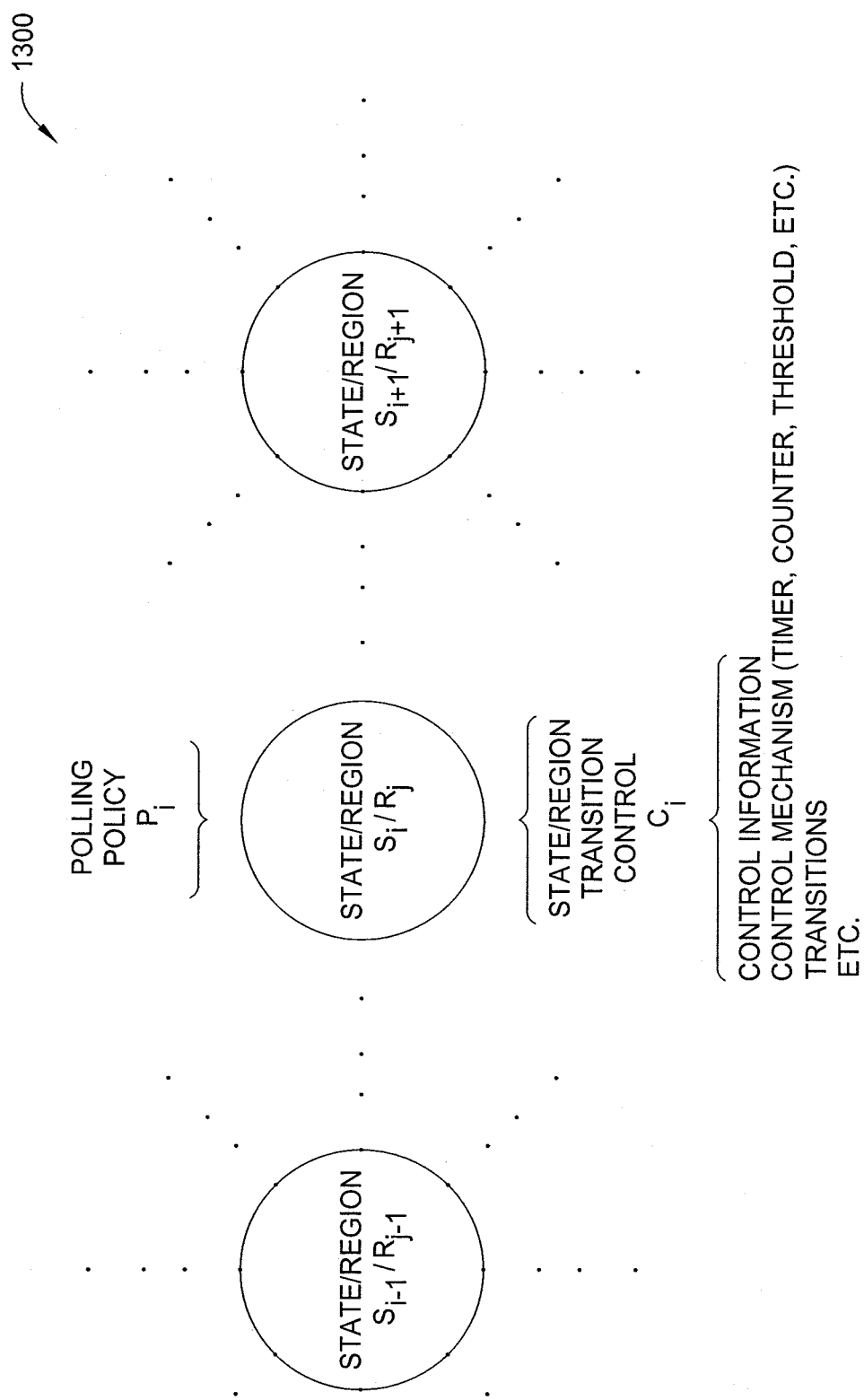
FIG. 13 depicts an exemplary set of states/regions supporting use of at least one of parametric control information and non-parametric control information to control polling of a device.

It will be appreciated, at least from the foregoing description, that a set of states or regions may be used to control polling of a set of devices. Each state or region may have a polling policy and a state transition control policy associated therewith. The policing policy of a state specifies the manner in which polling of the set of devices is performed when in that state (e.g., which may include one or more polling parameters, such as one or more of an indication of which device(s) in the set of devices is to be polled, a polling frequency, the information to be collected during polling, and the like). The state transition control policy of a state specifies the state transitions supported by that state (e.g., one or more upward transitions, one or more downward transitions, the type(s) of state transition control mechanism(s) used while in that state, specific values related to the state transition control mechanism(s) used while in that state, or the like, as well as various combinations thereof. It is noted that the state transition control logic associated with a particular state or region may be state transition control logic applied to some or all of the states or regions (e.g., state transition control logic does not vary across the states or regions) or state transition control logic specific to the particular state or region (e.g., the state transition control logic does vary across at least some of the states or regions). It is noted that each of the states or regions may support one or more upward state transitions and one or more downward state transitions. It is noted that values of different polling parameters may be changed on different state transitions (e.g., polling frequency may be changed on one state transition, polling frequency and the set of devices polled may be changed on another state transition, the set of devices polled and the information to be collected from the set of devices polled may be changed on another state transition, and so forth). An exemplary set of states/regions supporting use of at least one of parametric control information and non-parametric control information to control polling of a device is depicted in FIG. 13. As depicted in FIG. 13, the exemplary set of states/regions 1300 may include any suitable number of states/regions which may be arranged in any suitable manner. As further depicted in FIG. 13, each state/region $S_i/R_i$ has a polling policy $P_i$ and a state/region transition control policy $C_i$ associated therewith. The polling policy $P_i$ may specify values of one or more polling parameters to be used for polling while in the state/region $S_i/R_i$. The state/region transition control policy $C_i$ is based on control information (which may include one or both of parametric and non-parametric control information), one or more control mechanisms (e.g., timer-based, counter-based, threshold-based, or the like), a defined set of transitions, and the like.

It will be appreciated that, although omitted for purposes of clarity, the state transition control logic that is used for controlling transitions between states may be implemented in various ways.

In at least some embodiments, state transition control logic that is used for determining, based on the current polling policy state $S_i$ of the device and the polling policy state S indicated by the set of multiple control parameters, whether a state transition is needed (e.g., boxes 515 and 815 of FIGS. 5 and 8, respectively) may utilize a set of tables configured to indicate the type of transition that is needed. In at least some embodiments, for example, for each polling policy state, two tables are maintained and used as follows: (1) a table identifying immediate transitions is maintained, which lists each state in the set of states for which the state transition is to be performed immediately based on a determination that the polling policy state S indicated by the set of multiple control parameters identifies that state, (2) a table identifying controlled state transitions is maintained, which lists each state in the set of states for which the state transition is to be performed in a controlled manner based on a state transition mechanism (e.g., based on a timer, counter, threshold, or the like), (3) the current polling policy state $S_i$ of the device is always assigned to the table identifying immediate transitions, such that even-shift transitions (in which the polling policy state S of the device remains in the current polling policy state $S_i$ of the device) and up-shift transitions (in which the polling policy state S of the device transitions from the current polling policy state $S_i$ of the device to a higher polling policy state $S_j$ of the device) may be handled together (illustratively, boxes 520 and 525 of FIG. 5 may be merged with the transition being to the polling frequency state indicated by step 510 and, similarly, boxes 820 and 825 of FIG. 8 may be merged with the transition being to the polling policy state indicated by step 810), and (4) it is possible that, for one or more states, the table identifying controlled state transitions is empty (illustratively, the table identifying controlled state transitions would be empty for Regions 1 and 5 of FIGS. 6 and 7, since there is no up-shift transition from these regions). In at least some embodiments, for example, for each polling policy state, three tables are maintained and used as follows: (1) a table identifying an even-shift transition is maintained, which lists the current polling policy state $S_i$ of the device, where the state transition based on this table is to be performed immediately rather than based on a state transition control mechanism, (2) a table identifying up-shift transitions is maintained, which lists each state in the set of states for which an up-shift transition from the current polling policy state $S_i$ of the device is supported, where state transitions based on this table are to be performed immediately rather than based on a state transition control mechanism, and (3) a table identifying down-shift transitions is maintained, which lists each state in the set of states for which a down-shift transition from the current polling policy state $S_i$ of the device is supported, where state transitions based on this table are to be performed in a controlled manner based on a state transition control mechanism. It will be appreciated that other table-based embodiments are contemplated.

In at least some embodiments, state transition control logic that is used for determining, based on the current polling policy state $S_i$ of the device and the polling policy state S indicated by the set of multiple control parameters, whether a state transition is needed (e.g., boxes 515 and 815 of FIGS. 5 and 8, respectively) may utilize a set of input information evaluation rules that is configured to indicate the type of transition that is needed. For example, the input information evaluation rules may be based on values of the control parameter(s) where polling is based on a set of control parameters, non-parametric input information where polling is based on non-parametric control information, or the like, as well as various combinations thereof. For example, in continuation of the example provided with respect to FIGS. 6 and 7, the state transition control logic may be configured such that a controlled down-shift transition occurs based on a determination that (1) $f_x \leq f_y$ and $g_x < g_y$, and (2) either $f_x < f_y$ or $g_x < g_y$, (3) where $f_x$ and $g_x$ are the polling frequencies of the NTU and STB in the current polling frequency state and where $f_y$ and $g_y$ are the polling frequencies of the NTU and STB in the new polling frequency state if a transition to the new polling frequency occurs.

It will be appreciated that, in at least some embodiments, other state transition control logic may be used for determining, based on the current polling policy state $S_i$ of the device and the polling policy state S indicated by the set of multiple control parameters, whether a state transition is needed (e.g., boxes 515 and 815 of FIGS. 5 and 8, respectively).

It will be appreciated, although primarily depicted and described with respect to embodiments in which either parametric control information or non-parametric control information is used to control polling of a device, in at least some embodiments a combination of parametric control information and non-parametric control information may be used to control polling of a device. In at least some embodiments, various control regions may be defined based on a combination of parametric and non-parametric control information. In at least some embodiments, decomposition also may be used for decomposing portions of the control information. It will be appreciated that references herein to control regions $R_j$ also may be referred to as polling control regions $R_j$ or, more generally, regions $R_j$.

Figure 14:
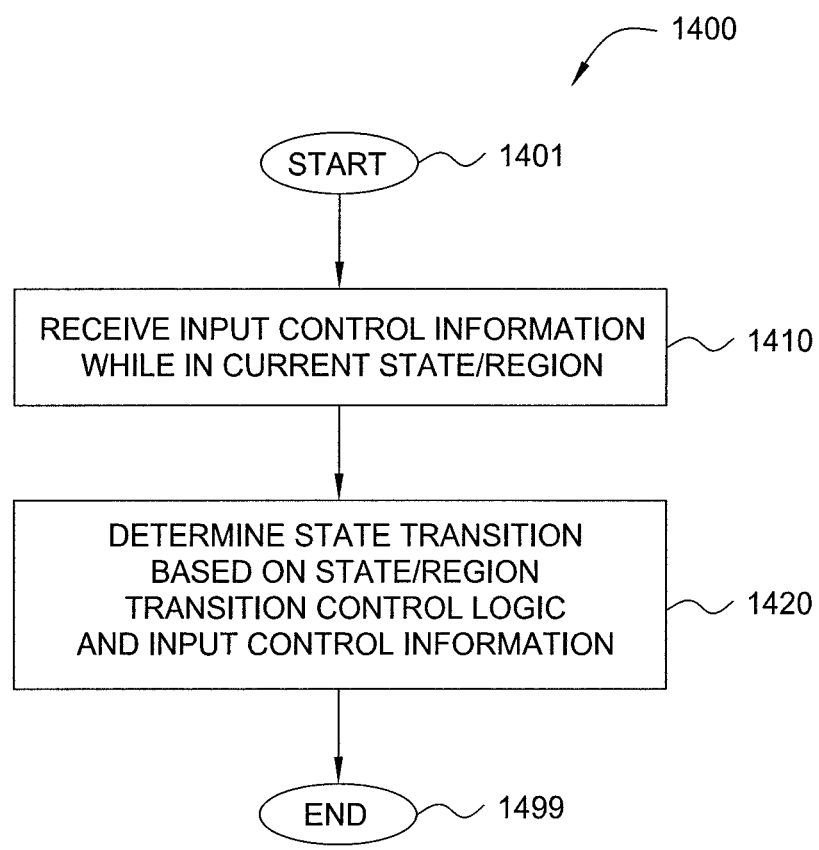
FIG. 14 depicts one embodiment of a method for using at least one of parametric control information and non-parametric control information to control polling of a device.

An exemplary embodiment of a more general process for using at least one of parametric control information and non-parametric control information to control polling of a device is depicted and described with respect to FIG. 14.

FIG. 14 depicts one embodiment of a method for using at least one of parametric control information and non-parametric control information to control polling of a device. It will be appreciated that, although depicted and described as being performed serially in a particular order, at least a portion of the steps of method 1400 may be performed contemporaneously or in a different order than presented in FIG. 14. At step 1401, method 1400 begins. At step 1410, input control information is received while in a current state/region. The input control information is associated with a set of states/regions defined for use in controlling polling of the device. The set of states/regions defined for use in controlling polling of the device may be based on at least one of parametric and non-parametric information and, thus, the input control information may include on at least one of parametric and non-parametric input information. At step 1420, a state transition is determined based on state/region transition control logic (which may be applied for each of the states/regions in the set of states/regions defined for use in controlling polling of the device, or which may be specific to the current state) and the input control information. The state transition may be a transition within the same state (e.g., having one or more different values of one or more internal parameters of the state) or a transition to a new state. At step 1499, method 1400 ends. The operation of method 1400 may be better understood by way of reference to FIGS. 1-13.

It will be appreciated that, although primarily depicted and described within the context of use of adaptive polling for polling communication devices in a communication network, various embodiments of adaptive polling depicted and described herein may be used in various other contexts.

For example, various embodiments of adaptive polling depicted and described herein may be used for adaptive polling of a personal sensor network of a firefighter (e.g., for polling one or more of an environmental temperature sensor, a heart rate sensor, or the like). For example, each of the sensors initially may be polled every two minutes. Then, if the value of one or more of the parameters increases close to its critical threshold, the polling frequency may be increased to once each minute or once every thirty seconds. Then, if the value of one or more of the parameters increases close to its critical threshold, the firefighter may be recalled.

For example, various embodiments of adaptive polling depicted and described herein may be used for adaptive polling of a sensor network of an environmental monitoring organization (e.g., polling for temperature, barometric pressure, wind speed, or the like). For example, each of the sensors initially may be polled every two hours. Then, if the value of one or more of the parameters is indicative of a storm (e.g., drop in barometric pressure, increase in wind speed, or the like), the polling frequency may be increased to once every thirty minutes or fifteen minutes to allow for more accurate tracking and forecasting of the storm.

It will be appreciated that various embodiments of adaptive polling depicted and described herein may be used for adaptive polling in any other suitable environments or applications in which use of adaptive polling may be necessary or desirable.

Figure 15:
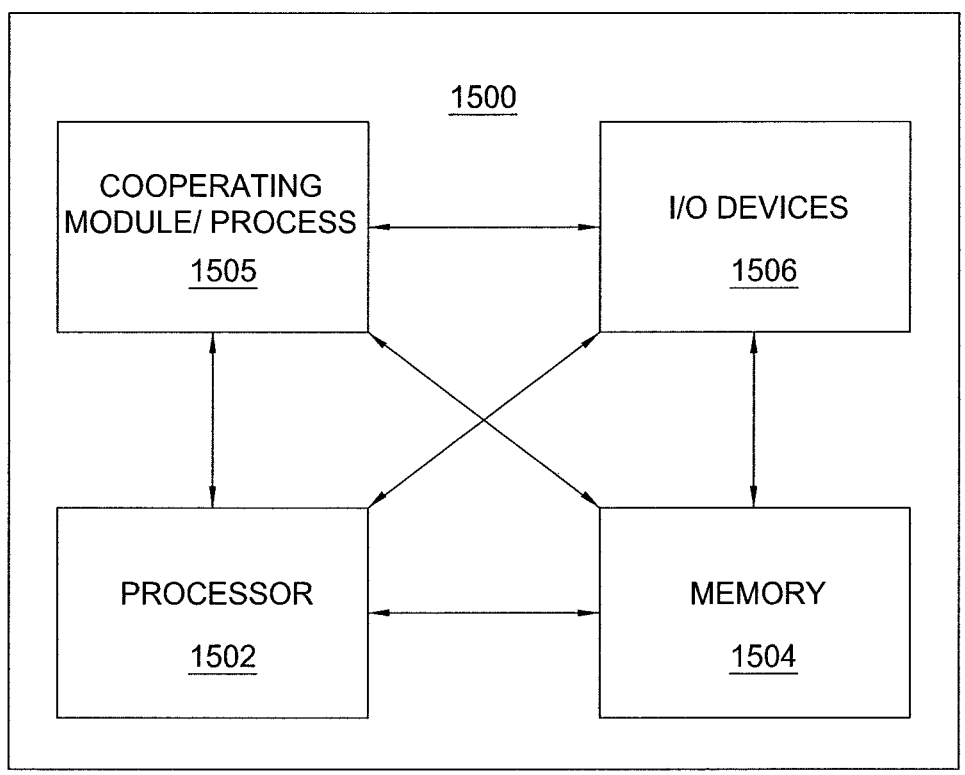
FIG. 15 depicts a high-level block diagram of a computer suitable for use in performing functions described herein.

FIG. 15 depicts a high-level block diagram of a computer suitable for use in performing functions described herein.

The computer 1500 includes a processor 1502 (e.g., a central processing unit (CPU) and/or other suitable processor(s)) and a memory 1504 (e.g., random access memory (RAM), read only memory (ROM), and the like).

The computer 1500 also may include a cooperating module/process 1505. The cooperating process 1505 can be loaded into memory 1504 and executed by the processor 1502 to implement functions as discussed herein and, thus, cooperating process 1505 (including associated data structures) can be stored on a computer readable storage medium, e.g., RAM memory, magnetic or optical drive or diskette, and the like.

The computer 1500 also may include one or more input/output devices 1506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1500 depicted in FIG. 15 provides a general architecture and functionality suitable for implementing functional elements described herein and/or portions of functional elements described herein. For example, computer 1500 provides a general architecture and functionality suitable for providing a data collection server configured to provide various embodiments of adaptive polling as depicted and described herein. For example, computer 1500 provides a general architecture and functionality suitable for implementing STB 102, RG 103, NTU 104, DCS 141, DAS 142, external system 150, or any other device or combination of devices depicted and described herein.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to control polling of a device based on a set of polling control regions configured to control polling of the device, the set of polling control regions being defined based on categorization of non-parametric control information, the set of polling control regions comprising at least two polling control regions, the processor configured to:
receive, while in a current polling control region of the set of polling control regions, input information comprising at least one of a set of values associated with a set of multiple control parameters and non-parametric input information, wherein the current polling control region comprises at least one of a value of a polling frequency parameter or an indication of information to be collected from the device;
determine a target polling control region, from the set of polling control regions, based on the input information; and
determine a transition within the set of polling control regions based on the current polling control region and the target polling control region.

2. The apparatus of claim 1, wherein the non-parametric control information comprises at least one of a keyword, a set of keywords, a phrase, a set of phrases, or a text string.

3. The apparatus of claim 1, wherein the transition within the set of polling control regions comprises at least one of an upward transition, an even transition, or a downward transition.

4. The apparatus of claim 1, wherein the processor is configured to determine the transition within the set of polling control regions based on transition control logic that is configured to support:
an immediate up-shift transition from the current polling control region to a higher polling control region; and
a controlled down-shift transition from the current polling control region to a lower polling control region.

5. The apparatus of claim 1, wherein the processor is configured to determine the transition within the set of polling control regions based on transition control logic configured to support at least one of:
a strict downward transition policy in which a downward transition from the current polling control region is required to be a transition to a next lower polling control region; or
a loose downward transition policy in which a downward transition from the current polling control region is not required to be a transition to a next lower polling control region.

6. The apparatus of claim 1, wherein the current polling control region comprises an indication of a set of devices to be polled.

7. An apparatus, comprising:
a processor and a memory communicatively connected to the processor, the processor configured to control polling of a device based on a set of polling control regions configured to control polling of the device, the set of polling control regions being defined based on a set of multiple control parameters, the set of polling control regions comprising at least two polling control regions, the processor configured to:
receive, while in a current polling control region of the set of polling control regions, input information comprising at least one of a set of values associated with the set of multiple control parameters and non-parametric input information, wherein the current polling control region comprises at least one of a value of a polling frequency parameter or an indication of information to be collected from the device;
determine a target polling control region, from the set of polling control regions, based on the input information; and
determine a transition within the set of polling control regions based on the current polling control region and the target polling control region;
wherein the set of polling control regions is defined based on at least one of:
partitioning the set of multiple control parameters into the set of polling control regions;
decomposing the set of multiple control parameters into multiple subsets of control parameters and mapping the multiple subsets of control parameters into the set of polling control regions; or
decomposing the set of multiple control parameters into multiple subsets of control parameters and, for at least one of the subsets of control parameters including at least two control parameters from the set of multiple control parameters, partitioning the subset of control parameters to form at least two of the polling control regions.

8. The apparatus of claim 7, wherein partitioning of the set of multiple control parameters into the set of polling control regions is based on at least one of:
a set of partition boundaries defined by at least one equation based on two or more control parameters in the set of multiple control parameters; or
a set of thresholds associated with at least one of the control parameters in the set of multiple control parameters.

9. The apparatus of claim 7, wherein partitioning of the set of multiple control parameters into the set of polling control regions is based on:
for one of the control parameters of the set of multiple control parameters:
a first set of thresholds for use in controlling upward transitions based on the one of the control parameters; and
a second set of thresholds for use in controlling downward transitions based on the one of the control parameters.

10. The apparatus of claim 7, wherein at least one control parameter from the set of multiple control parameters comprises a combined control parameter defined based on a combination of at least two input control parameters.

11. The apparatus of claim 10, wherein the combination of the at least two input control parameters comprises at least one of:
a linear combination of at least a portion of the at least two input control parameters;
a weighted linear combination of at least a portion of the at least two input control parameters;
a combination of higher-order terms of at least a portion of the at least two input control parameters; or
a general function of at least a portion of the at least two input control parameters.

12. The apparatus of claim 7, wherein the transition within the set of polling control regions comprises at least one of an upward transition, an even transition, or a downward transition.

13. The apparatus of claim 7, wherein the processor is configured to determine the transition within the set of polling control regions based on transition control logic that is configured to support:
- an immediate up-shift transition from the current polling control region to a higher polling control region; and
- a controlled down-shift transition from the current polling control region to a lower polling control region.

14. The apparatus of claim 7, wherein the processor is configured to determine a transition within the set of polling control regions based on transition control logic configured to support at least one of:
- a strict downward transition policy in which a downward transition from the current polling control region is required to be a transition to a next lower polling control region; or
- a loose downward transition policy in which a downward transition from the current polling control region is not required to be a transition to a next lower polling control region.

15. The apparatus of claim 7, wherein the current polling control region comprises an indication of a set of devices to be polled.

16. An apparatus, comprising:
- a processor and a memory communicatively connected to the processor, the processor configured to control polling of a device based on a set of polling control regions configured to control polling of the device, the set of polling control regions being defined based on at least one of a set of multiple control parameters and non-parametric control information, wherein at least one control parameter from the set of multiple control parameters comprises a combined control parameter defined based on a combination of at least two input control parameters, the set of polling control regions comprising at least two polling control regions, the processor configured to:
  - receive, while in a current polling control region of the set of polling control regions, input information comprising at least one of a set of values associated with the set of multiple control parameters and non-parametric input information;
  - determine a target polling control region, from the set of polling control regions, based on the input information; and
  - determine a transition within the set of polling control regions based on the current polling control region and the target polling control region.

17. A method, comprising:
using a processor and a memory for:
- controlling polling of a device based on a set of polling control regions configured to control polling of the device, the set of polling control regions being defined based on at least one of a set of multiple control parameters and non-parametric control information, wherein at least one control parameter from the set of multiple control parameters comprises a combined control parameter defined based on a combination of at least two input control parameters, the set of polling control regions comprising at least two polling control regions, wherein controlling polling of the device comprises:
  - receiving, while in a current polling control region of the set of polling control regions, input information comprising at least one of a set of values associated with the set of multiple control parameters and non-parametric input information;
  - determining a target polling control region, from the set of polling control regions, based on the input information; and
  - determining a transition within the set of polling control regions based on the current polling control region and the target polling control region.

* * * * *